US009494297B1

(12) United States Patent
Nagengast et al.

(10) Patent No.: US 9,494,297 B1
(45) Date of Patent: Nov. 15, 2016

(54) SOLAR-POWERED LED MODULE AND LIGHTING FIXTURES

(75) Inventors: William E. Nagengast, Anderson, IN (US); Judy Nagengast, Anderson, IN (US); Steven F. Tregilgas, Hugo, MN (US); Jerry D. Heiniger, Anderson, IN (US)

(73) Assignee: Continental Manufacturing, LLC, Anderson, IN (US)

( * ) Notice: Subject to any disclaimer, the term of this patent is extended or adjusted under 35 U.S.C. 154(b) by 1160 days.

(21) Appl. No.: 13/301,575

(22) Filed: Nov. 21, 2011

Related U.S. Application Data

(60) Provisional application No. 61/415,663, filed on Nov. 19, 2010, provisional application No. 61/530,835, filed on Sep. 2, 2011.

(51) Int. Cl.
*F21V 13/04* (2006.01)
*G02B 3/00* (2006.01)

(52) U.S. Cl.
CPC .............. *F21V 13/04* (2013.01); *G02B 3/00* (2013.01)

(58) Field of Classification Search
CPC ............ G02B 27/017; G02B 2027/0178; G02B 27/0093; G02B 19/0028; G02B 19/0061; G02B 3/00; G02B 1/041; G02B 6/0073; G06F 3/013; G06Q 30/02; G02C 7/00; G02C 7/081; G02C 7/086; G02C 9/00; F21Y 2101/02; B60L 11/182; B60L 2230/22; B60R 2001/1223; F21V 23/0464; F21V 5/04; F21V 13/04; F21V 13/02; F21V 5/007; F21V 5/048; F21V 23/003; F21V 23/009; F21V 29/70; F21V 29/74; F21V 31/005; F21V 3/00; F21V 5/045; F21V 7/0066; F21V 7/0091; F21V 13/10; F21V 13/14; F21V 14/04; F21V 14/06; F21V 14/065; F21V 15/01; F21V 15/04; F21V 17/10; F21V 19/0045; F21V 19/04; F21V 21/03; F21V 23/002; F21V 23/005; F21V 23/0407; F21V 23/0414; F21V 23/06; F21V 29/004; F21V 29/15; F21V 29/22; F21V 29/2206; F21V 29/503; F21V 5/00; F21V 5/002; F21V 5/005; F21V 5/008; F21V 5/043; F21V 5/046; F21V 7/00; F21V 7/0033; F21V 7/043; F21V 9/14; F21V 9/16; Y02E 10/50; F21K 9/50; F21K 9/56; F21K 9/00; F21K 9/135; F21K 9/1355; F21K 9/175; F21K 9/52; F21K 9/58; F21L 4/08; F21L 4/005; F21L 4/085; B60Q 1/0035; B60Q 1/0041; B60Q 1/0047; B60Q 1/2665; B60Q 1/28; B60Q 1/48; B60Q 1/52; B60Q 2400/40
USPC ............... 165/48.2; 362/183; 345/8, 633; 307/104; 315/70; 320/108
See application file for complete search history.

(56) References Cited

U.S. PATENT DOCUMENTS 5,471,372 A * 11/1995 Mamelson et al. ............ 362/92
6,573,659 B2 * 6/2003 Toma et al. .................... 315/149
(Continued)

*Primary Examiner* — Stephen F Husar
*Assistant Examiner* — Danielle Allen
(74) *Attorney, Agent, or Firm* — Reichel Stohry LLP; Mark C. Reichel; Natalie J. Dean

(57) ABSTRACT

An exemplary embodiment of a solar-powered lighting fixture includes a solar panel electrically connected to a control circuit, a rechargeable battery to store electrical energy generated by the solar panel, and a LED module with a lens, wherein the lens has a plurality of integral optical elements comprising an inner refracting surface and an outer refracting surface, and the control circuit is capable of charging the battery by adjusting the charge current from the solar panel to the battery, automatically powering the at least one light-emitting diode on and off, and automatically adjusting the level and duration of electrical current provided to the at least one light-emitting diode. In at least one embodiment, the control circuit includes a microprocessor to calculate an operational profile based on the charge stored in the battery and an anticipated power requirement.

21 Claims, 35 Drawing Sheets

(56) References Cited

U.S. PATENT DOCUMENTS

| | | |
|---|---|---|
| 7,815,333 B2 | 10/2010 | Liu |
| 2004/0095777 A1* | 5/2004 | Trenchard et al. ............ 362/477 |
| 2005/0024744 A1* | 2/2005 | Falicoff et al. ............... 359/737 |
| 2006/0146534 A1 | 7/2006 | Morton et al. |
| 2007/0115139 A1* | 5/2007 | Witte et al. ................... 340/909 |
| 2009/0303703 A1 | 12/2009 | Kao et al. |
| 2010/0073920 A1 | 3/2010 | Xiao et al. |
| 2011/0255278 A1* | 10/2011 | Dassanayake et al. ....... 362/230 |

\* cited by examiner

SOLAR-POWERED LED MODULE AND LIGHTING FIXTURES

PRIORITY

The present U.S. patent application is related to, and claims the priority benefit of, U.S. Provisional Patent Application Ser. No. 61/415,663, filed Nov. 19, 2010, and 61/530,835, filed Sep. 2, 2011, the contents of which is hereby incorporated by reference in its entirety into this disclosure.

BACKGROUND

Solid-state lighting fixtures, such as those using light emitting diodes (LEDs) are not yet widely used for general illumination. Nonetheless, solid-state lighting technology is rapidly evolving, and more powerful LEDs are being released every 6-12 months. Though very energy efficient, LEDs are just now being developed with sufficient efficacy (i.e., light output for unit of energy input, or lumens per Watt) to enable lighting systems based on one or a small number of LEDs. As a result to produce sufficient illumination in most applications, prior art solid-state lighting systems utilized many LEDs, such as clusters of LEDs arranged on printed circuit boards in arrays and mounted to large, heavy, and expensive heat sinks. However, if an LED malfunctioned it was not efficiently replaceable. Most LEDs could not be unscrewed simply and replaced as with other forms of lighting, such as incandescent, fluorescent, high-pressure sodium, metal halide, high-intensity discharge, and others. Furthermore, as newer, brighter, higher efficacy LEDs came on the market, the entire prior art LED array required replacement, and likely a complete heat sink redesign, because the system was most often constructed as a single integrated unit. Today, few modularized lighting systems are available that allow for upgrades to the newest LED technology without developing new components for the rest of the system.

In addition, LED lighting fixtures are extremely efficient in terms of both power consumption and reliability. In economic terms, operating costs for LED fixtures are approximately one-tenth the cost of standard incandescent or tungsten-halogen lamps and just one hundredth the cost of natural gas powered lamps. Furthermore, LED light sources can operate 50,000-100,000 hours depending on conditions compared to thousands of hours for conventional light sources. Consequently; there are tremendous economic advantages to providing LED-based lighting fixtures that consume much less energy with greatly reduced maintenance costs. Given their power efficiency, LEDs are uniquely capable of using solar-powered rechargeable batteries to operate separate from the electrical power grid. However, because the amount of available solar power varies by location and from day to day due to weather variability, the charging of the batteries and the powering of the LEDs must be careful controlled to provide a reliable light fixture.

Directing and controlling the light output from an LED is also a challenge. Most prior art systems used either no optics, preferring to simply aim arrays or individual LEDs where light was desired, or used individual lens caps (known as total internal reflection lenses or TIRs) mounted directly over each LED. However, these prior art methods generally resulted in a series of over-illuminated hot spots of increased intensity light surrounded by darker rings of lower intensity. These non-uniform light distributions represented wasted energy since an efficient lens design can effectively spread the light from a hot spot out over a larger area, thereby improving safety and nighttime security. Moreover, with recent dark sky compliance requirements and regulations directed to decreasing light pollution becoming a new criteria for outdoor municipal and commercial lighting systems, control of light becomes a more critical issue.

Finally, there is an important aesthetic aspect to the conversion to solid-state lighting systems. Consumers have very strong preferences for light fixtures that resemble the prior art systems with which they are familiar. Maintaining these familiar form factors prevents the use of prior art TIRs in most cases and generates additional difficulties for efficiently directing light in a useful distribution for a given application. Therefore, there is a need for a modular LED light engine that can be utilized in many different applications, is adaptable to the continuing improvements in LED efficacy and construction, controls the light output effectively and efficiently, and has an aesthetically appealing form factor. Further, there is a need for a solar-powered lighting fixture utilizing LEDs with automatic control of light output to adjust power consumption to the corresponding solar illumination available for recharging the lighting fixture.

BRIEF SUMMARY

The present disclosure includes disclosure of a solar-powered lighting fixture. At least one embodiment of a solar-powered lighting fixture includes at least one light-emitting diode electrically connected to a control circuit, at least one solar panel electrically connected to the control circuit and capable of converting solar radiation into electrical energy, wherein the electrical energy is stored in a rechargeable battery electrically connected to the control circuit, at least one lens, wherein the lens is comprised of a plurality of integral optical elements comprising an inner refracting surface and an outer refracting surface, and wherein the control circuit is capable of charging the rechargeable battery by adjusting the charge current from the solar panel to the battery, automatically powering the at least one light-emitting diode on and off, providing the at least one light-emitting diode with constant electrical current when powered, and automatically adjusting the level and duration of electrical current provided to the at least one light-emitting diode.

In at least one such embodiment of the present disclosure, the control circuit includes a microprocessor to calculate an operational profile based on the charge stored in the rechargeable battery and an anticipated power requirement for the next cycle. In an aspect of at least one such embodiment of the present disclosure, the control circuit is configured to adjust the power provided to the at least one light-emitting diode by incremental steps from one power level to the next over time. In an aspect of at least one such embodiment of the present disclosure, the control circuit includes an electronic real time clock. In an aspect of at least one such embodiment of the present disclosure, the control circuit further includes a calendar look-up table comprising sunrise and sunset information for one year. In an aspect of at least one such embodiment of the present disclosure, the control circuit is configured to adjust the charge current from the solar panel to the battery using a maximum power point tracking circuit. In an aspect of at least one such embodiment of the present disclosure, the control circuit is configured to monitor the solar panel voltage and to determine when to power the at least one light-emitting diode on and off. In an aspect of at least one such embodiment of the present disclosure, the control circuit includes a timer function. In an aspect of at least one such embodiment of the present disclosure, the control circuit includes a remote control sensor. In an aspect of at least one such embodiment of the present disclosure, the control circuit includes a communication port.

In at least one such embodiment of the present disclosure, the solar panel array is formed to complement the shape of the lighting fixture. In an aspect of at least one such embodiment of the present disclosure, the lens is capable of directing light from an upward facing light-emitting diode into a light distribution arc substantially greater than 270 degrees from the optical axis of the at least one light-emitting diode.

In an aspect of at least one such embodiment of the present disclosure, a LED light module includes a heat sink, a light-emitting diode in thermal contact with the heat sink, and a lens, wherein the lens is comprised of a plurality of integral optical elements comprising an inner refracting surface and an outer refracting surface. In an aspect of at least one such embodiment of the present disclosure, the optical elements are configured to direct light emitted by the light-emitting diode into a desired light distribution. In an aspect of at least one such embodiment of the present disclosure, the desired light distribution is entirely below a horizontal plane. In an aspect of at least one such embodiment of the present disclosure, the desired light distribution spans an arc substantially greater than 270 degrees from the optical axis of the at least one light-emitting diode.

In an aspect of at least one such embodiment of the present disclosure, a variable optic lens includes a plurality of integral optical elements comprising an inner optical surface and an outer optical surface, wherein the inner optical surface is comprised of at least one refracting facet and at least one internally reflecting facet, and the outer optical surface is comprised of a substantially curvilinear refracting surface. In an aspect of at least one such embodiment of the present disclosure, the integral optical elements are capable of directing light from an upward facing light-emitting diode into a light distribution that is entirely below a horizontal plane. In an aspect of at least one such embodiment of the present disclosure, the desired light distribution spans an arc substantially greater than 270 degrees from the optical axis of the at least one light-emitting diode. In an aspect of at least one such embodiment of the present disclosure, the outer optical surface mimics the contours of a traditional light source.

In an aspect of at least one such embodiment of the present disclosure, an improved solar-powered LED lighting fixture provides substantial increases in the apparent light output and battery life compared to the prior art solar-powered LED-based lighting fixtures through a wide range of operating conditions by optimizing battery charging and discharging cycles. In an aspect of at least one such embodiment of the present disclosure, the solar panels are integrated into the lamp fixture in an aesthetically pleasing manner and incorporate optical features that create a unique lit appearance from other LED lighting fixtures. In an aspect of at least one such embodiment of the present disclosure, the lighting fixture can continually communicate its operational parameters, such as power consumption and availability, to a remote user for monitoring, analysis, and maintenance.

BRIEF DESCRIPTION OF THE DRAWINGS

The above mentioned embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

Like reference numerals indicate the same or similar parts throughout the several figures.

Figure 1:
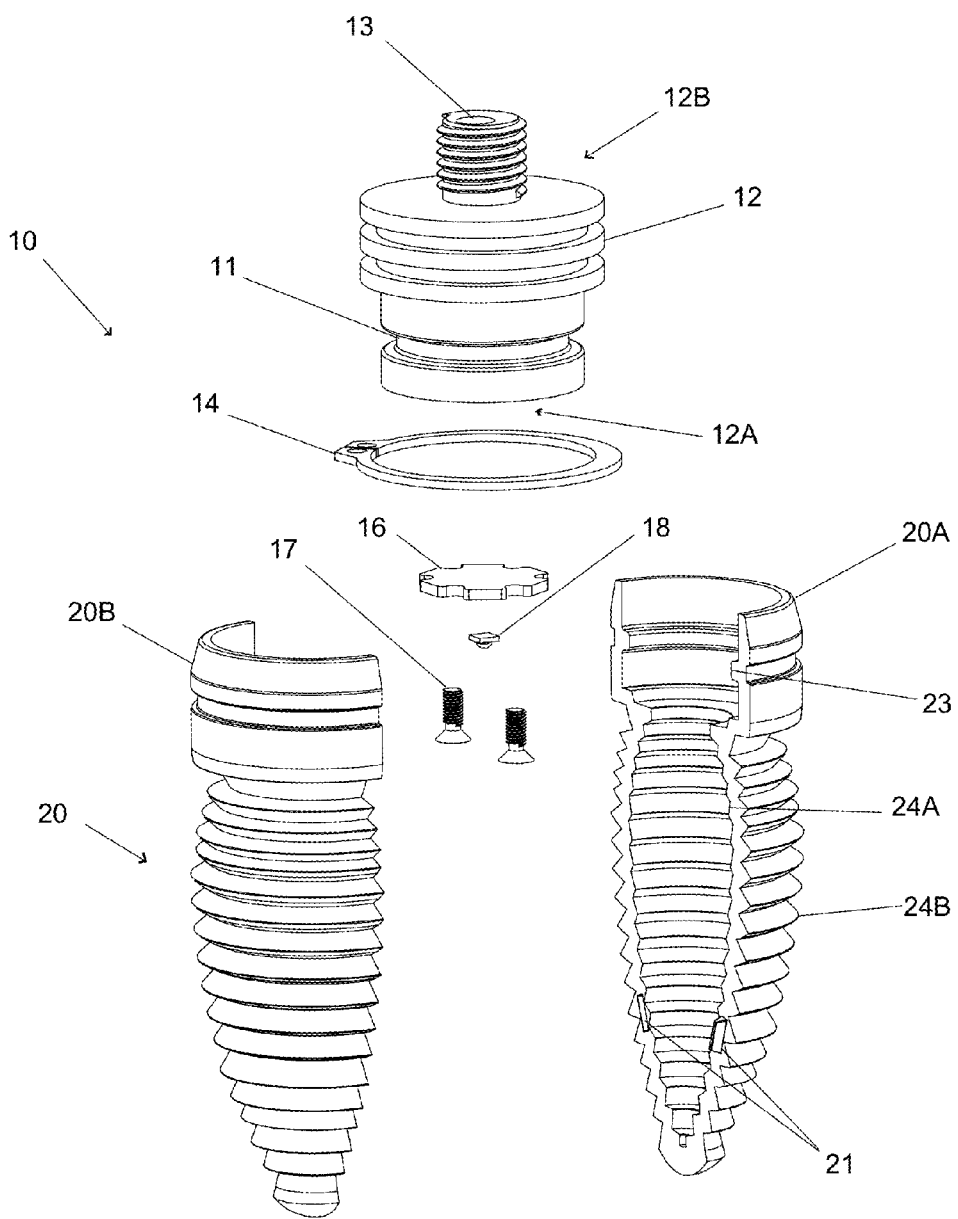
FIG. 1 shows an exploded isometric view of a LED light module with variable optic lens, according to at least one embodiment of the present disclosure.
Figure 2:
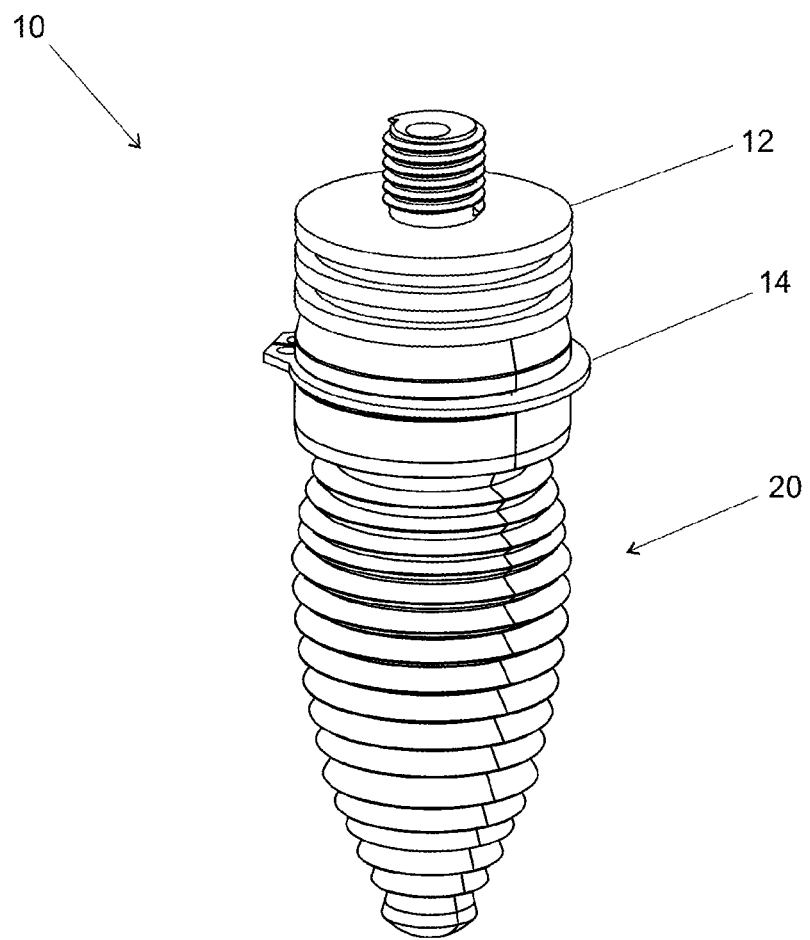
FIG. 2 shows an isometric view of a LED light module with variable optic lens, according to at least one embodiment of the present disclosure.
Figure 3:
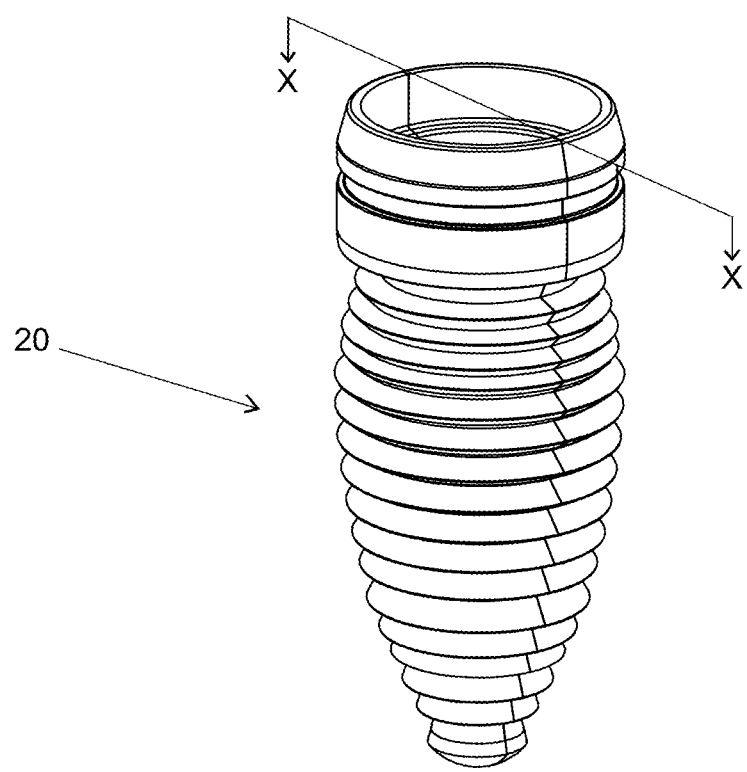
FIG. 3 shows an isometric view of a variable optic lens assembly, according to at least one embodiment of the present disclosure.
Figure 4:
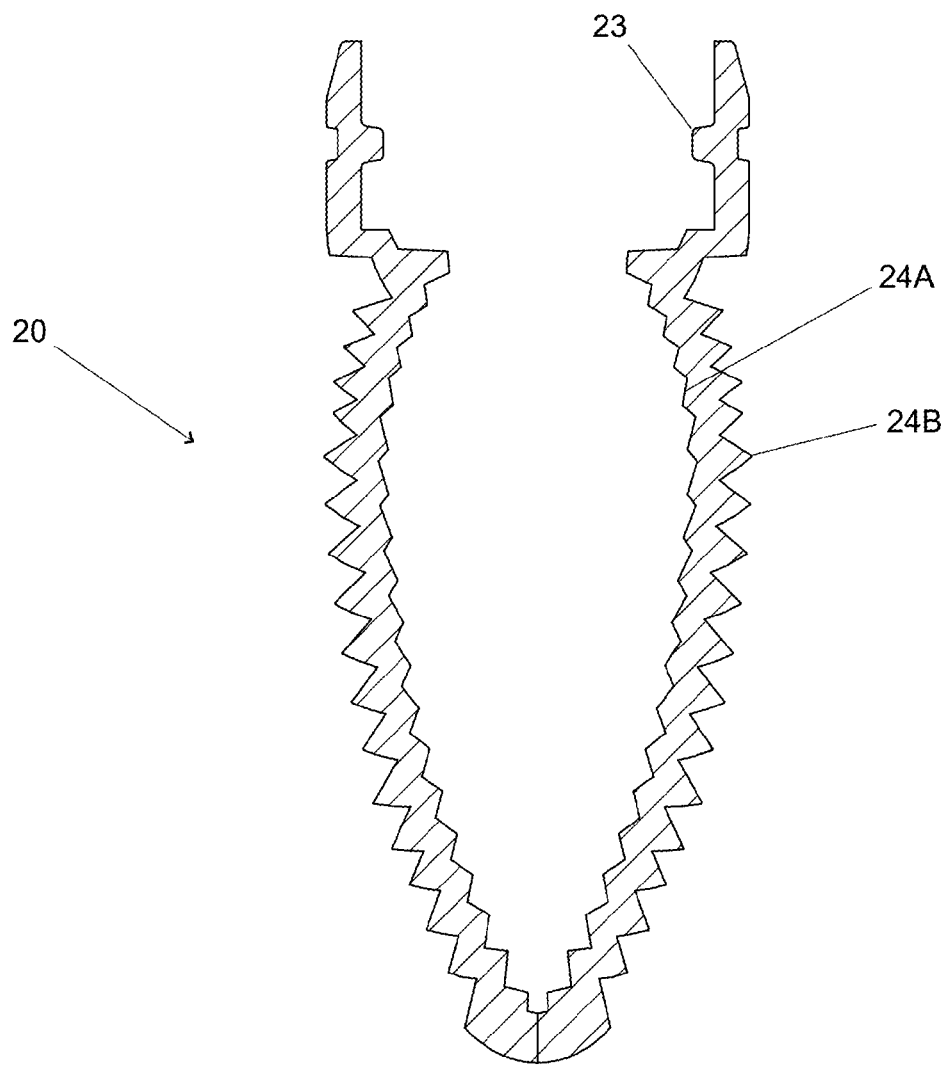
FIG. 4 shows a cross-sectional view of a variable optic lens assembly at a plane X-X, according to at least one embodiment of the present disclosure.

An overview of the features, functions and/or configuration of the components depicted in the various figures will now be presented. It should be appreciated that not all of the features of the components of the figures are necessarily described. Some of these non-discussed features, such as various couplers, etc., as well as discussed features are inherent from the figures. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

An exemplary embodiment of a LED light module with a variable optic lens according to the present disclosure is shown in FIG. 1. As shown in FIG. 1, a LED light module 10 may include a heat sink 12, at least one light-emitting diode (LED) 18, and a variable optic lens assembly 20.

The heat sink 12 functions to transfer heat from the at least one LED 18 to the ambient environment and includes a light source side 12A and a mounting side 12B, a locating feature 11, and a through hole 13. The light source side 12A of the heat sink 12 is configured to attach at least one LED 18 in thermal contact with the heat sink 12. The mounting side 12B of the heat sink 12 is configured to mount the heat sink 12 to a lighting fixture body (not shown) by a means of attachment, such as a threaded hole, one or more screws, structural adhesive, or other suitable means. The locating feature 11 is capable of properly positioning the lens assembly 20 relative to the heat sink 12. In at least one embodiment, the heat sink 12 may also include a plurality of grooves around its periphery to act as cooling fins and thereby improve heat transfer between the heat sink 12 and the ambient environment.

According to at least one embodiment of the present disclosure, the through hole 13 extends from the light source side 12A, through the body of the heat sink 12, to the mounting side 12B, and is sized to enable passage of an electric connection, such as twenty-gauge, seven-strand copper wire, from the at least one LED 18 on the light source side 12A to a power source (not shown) on the mounting side 12B. The heat sink 12 is made of a material that readily conducts heat, such as copper, aluminum, or other suitably conductive material, and may be manufactured by casting, forging, molding, machining, or other suitable process.

In at least one embodiment of the present disclosure, the at least one LED 18 includes a semiconductor chip having a light emitting p-n junction for generating light, an electrically isolated metal base or slug, a bottom surface that may be in contact with, or coated with, a reflective material to reflect generated light upward, and a means of electrical connection. In at least one embodiment of the present disclosure, the at least one LED 18 is a high-output white light LED, such as the XP-G LED manufactured by Cree,™ Inc.; however, many possible LED light sources are operable in the system, including, but not limited to, Cree™ CXA and MLE products. In at least one embodiment of the present disclosure, the at least one LED 18 is in thermal and electrical contact with a circuit board 16 and is fixed in position on the circuit board 16 with a thermally conductive adhesive or similar means. The circuit board 16 is in thermal contact with the heat sink 12, enables an electrical connection between the LED 18 and a power source (not shown), and is comprised of a metal core to maximize heat transfer from the at least one LED 18 to the heat sink 12. The circuit board 16 is fixed to the heat sink 12 by a means of attachment 17, such as at least one machine screw, a thermally conductive adhesive, or similar means.

In at least one embodiment of the present disclosure, the lens assembly 20 includes two halves, 20A and 20B. Each half 20A and 20B includes indexing features 21, at least one lens locating feature 23, and a plurality of optical elements 22, which define an interior optical surface 24A and an exterior optical surface 24B. The plurality of optical elements 22 will be discussed more fully with regards to FIGS. 5-8.

In at least one embodiment of the present disclosure, the indexing features 21 are configured to alignment of the halves 20A and 20B during assembly. The indexing features 21 may be further configured to enable the two halves 20A and 20B to be the same part. Consequently, the halves 20A and 20B may be molded or cast in the same mold or, alternatively, manufactured using the same process. In at least one embodiment of the present disclosure, each half 20A and 20B of the lens assembly 20 may be secured together and held securely to the heat sink 12 by a retaining ring 14. The retaining ring 14 could be any suitable means for securing each half 20A and 20B together and to the heat sink 12, such as a metal spring-loaded clip or a plastic pull-tie. The lens assembly 20 may be positioned relative to the heat sink 12 by the at least one lens locating feature 23, which is configured to mate with the locating feature 11 on heat sink 12, thereby properly positioning the optical elements 22 of the lens assembly 20 relative to the at least one LED 18 to maximize the efficacy of the module 10.

In at least one embodiment of the present disclosure, each half 20A and 20B of the lens assembly 20 is made of a substantially optically transparent material, including but not limited to glass, cyclic olefin copolymer (COC), polymethylmethacrolate (PMMA), polycarbonate (PC), PC/PMMA composite, silicones, fluorocarbon polymers, and polyetherimide (PEI), having an index of refraction ranging from between about 1.35 to about 1.7. In at least one embodiment of the present disclosure, the lens' index of refraction may be about 1.53 but may be higher or lower based on the material selected for a given embodiment. The volume of space within the lens assembly 20 is comprised of ambient air, having an index of refraction of approximately 1.0003.

Figure 5:
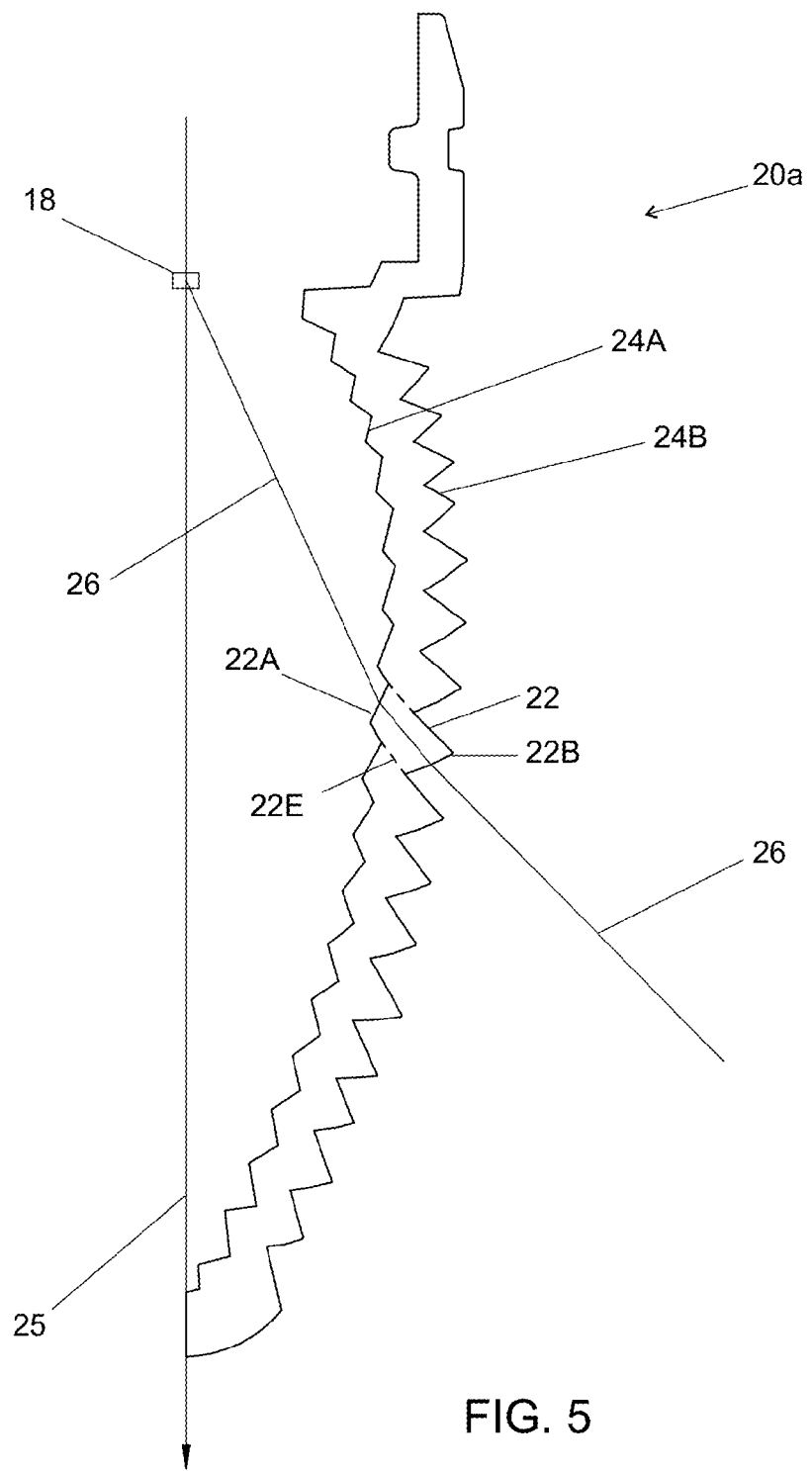
FIG. 5 illustrates ray traces from a LED light source and a lens, according to at least one embodiment of the present disclosure.

An exemplary embodiment of a LED light module with a variable optic lens according to the present disclosure is shown in FIG. 5. As shown in FIG. 5, each lens half 20A and 20B is defined by an interior optical surface 24A and an exterior optical surface 24B. The interior optical surface 24A is further defined by a plurality of interior facets 22A, such that each optical element 22 has at least one interior facet 22A. The exterior optical surface 24B is further defined by a plurality of exterior facets 22B, such that each optical element 22 has at least one exterior facet 22B. Thus, a given optical element 22 is defined by its interior facet 22A, its exterior facet 22B, and imaginary surfaces 22E connecting the corners of its interior facet to the corresponding corners of its exterior facet 22B.

Figure 6:
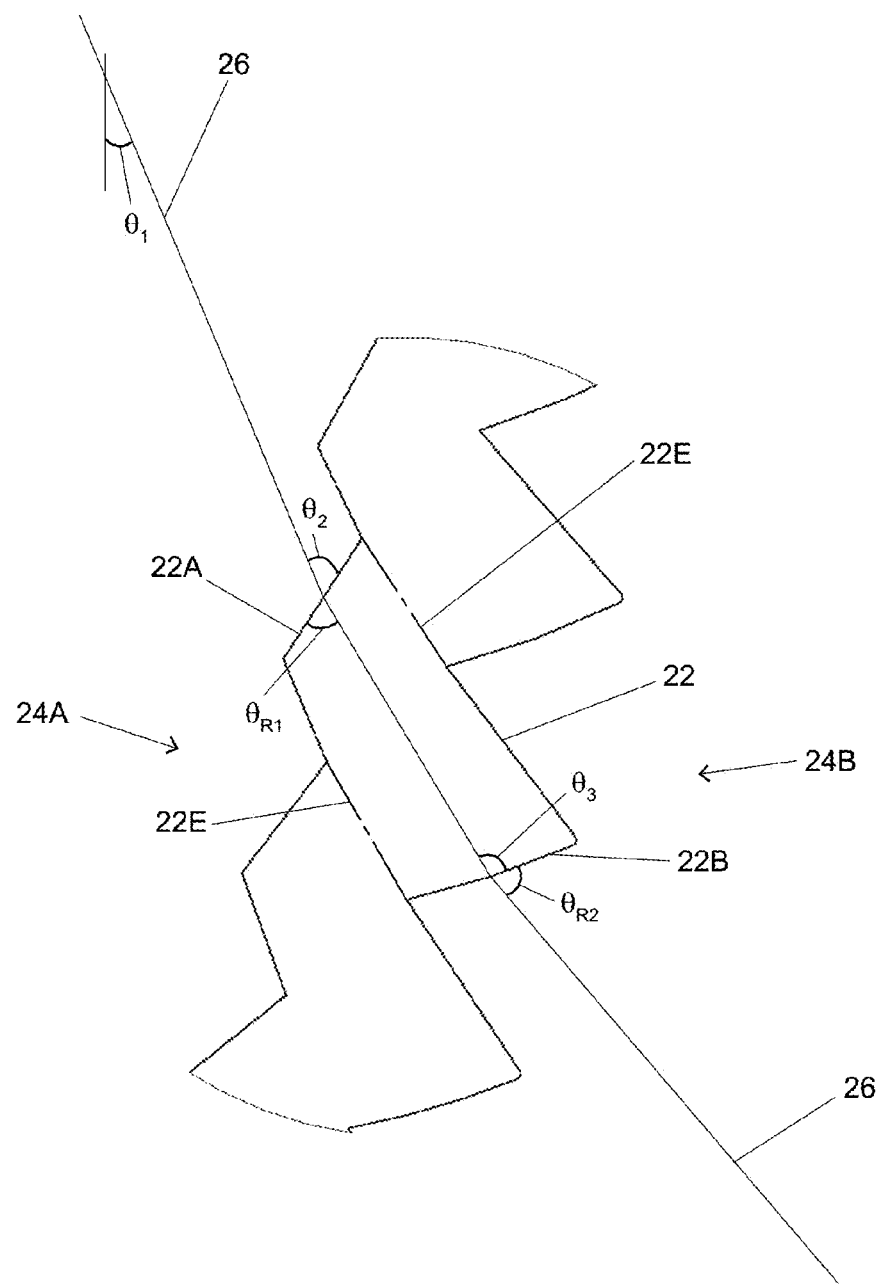
FIG. 6 illustrates detailed ray traces of a lens, according to at least one embodiment of the present disclosure.

In at least one embodiment of the present disclosure, both the plurality of interior facets 22A and the plurality of exterior facets 22A are refractive surfaces. As shown in FIG. 6, an exemplary light ray 26 is emitted from the at least one LED 18 at an angle $\theta_1$ relative to the lens longitudinal axis 25. The light ray 26 is incident upon the exemplary interior facet 22A at angle $\theta_2$ relative to the interior optical surface 24A at the point of intersection. The interior facet 22A refracts the light ray 26 according to Snell's Law, which in this exemplary case is:

$$n_1 * \sin(90° - \theta_2) = n_{20} * \sin(90° - \theta_{R1}),$$

where $n_1$ is the refractive index of air and $n_{20}$ is refractive index of the material comprising the lens assembly 20.

Consequently, the light ray 26 proceeds from the interior facet 22A at a first angle of refraction $\theta_{R1}$ relative to the interior optical surface 24A. The light ray 26 proceeds through the body of the optical element 22 until falling incident upon the exterior facet 22B at angle $\theta_3$ relative to the exterior optical surface 24B at the point of intersection. The interior facet 22A and the exterior facet 22B are configured such that a light ray 26 incident on the exterior facet 22B will be refracted by the exterior facet 22B. As a result, the exterior facet 22B further refracts light ray 26, which exits the optical element 22 at a second angle of refraction $\theta_{R2}$ according to Snell's Law, which in this exemplary case is:

$$n_{20} * \sin(\theta_3 - 90°) = n_1 * \sin(90° - \theta_{R2})$$

Figure 7:
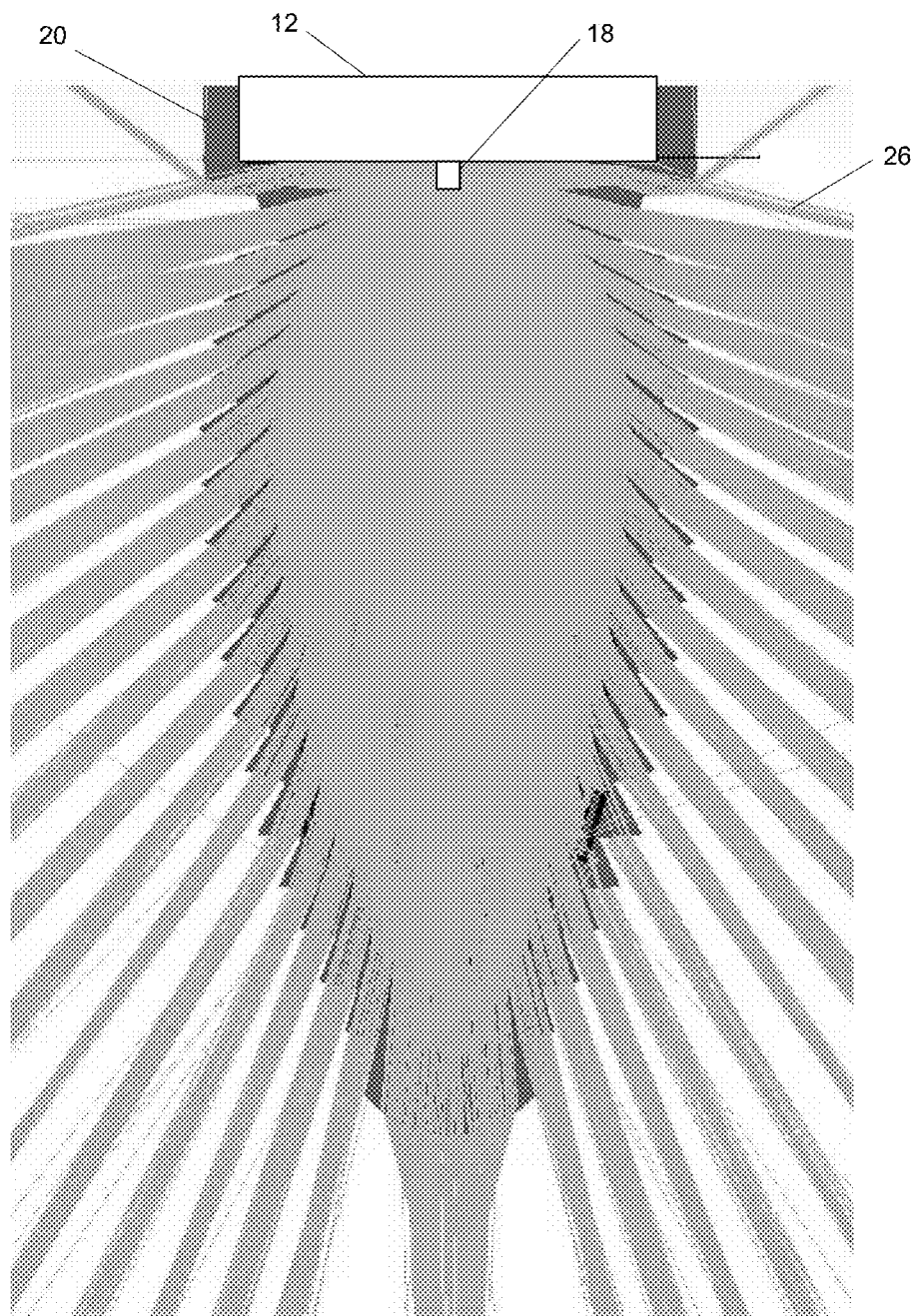
FIG. 7 illustrates composite ray traces for a LED light module with variable optic lens, according to at least one embodiment of the present disclosure.

In at least one embodiment of the present disclosure, each of the plurality of interior facets 22A is configured to refract the light ray 26 at a different first angle of refraction $\theta_{R1}$. Likewise, each of the plurality of exterior facets 22B is configured to refract the light ray 26 at a different second angle of refraction $\theta_{R2}$. Therefore, the facets 22A and 22B are further configured to cooperatively refract the light ray 26 to a desired angle of illumination, that being $\theta_{R2}$. In at least one embodiment of the present disclosure, the angle $\theta_{R2}$, resulting from each optical element 22, is such that substantially all light rays 126 are refracted at an angle below a horizontal plane, meaning greater than 90 degrees from the lens longitudinal axis 125, as shown in FIG. 7.

Figure 8:
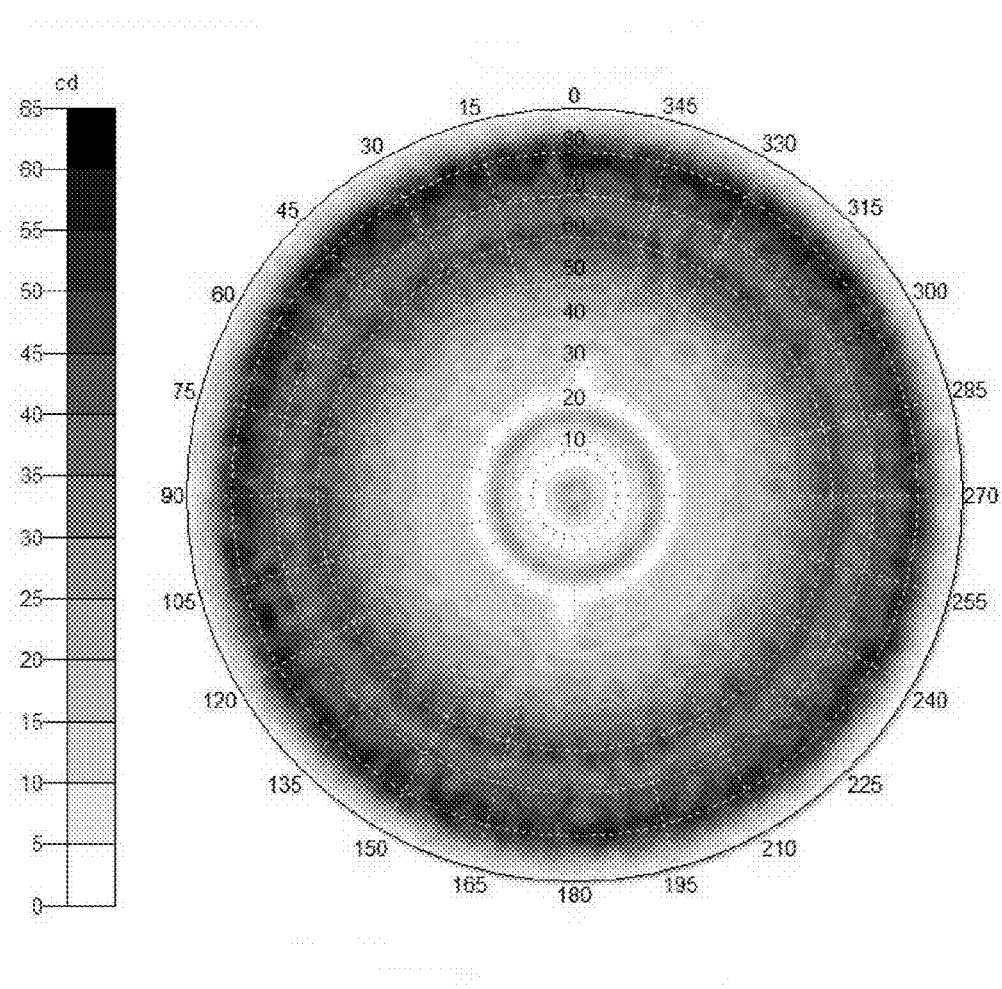
FIG. 8 presents a polar iso-illumination plot, as measured in Candela (cd), according to at least one embodiment of the present disclosure.
Figure 9:
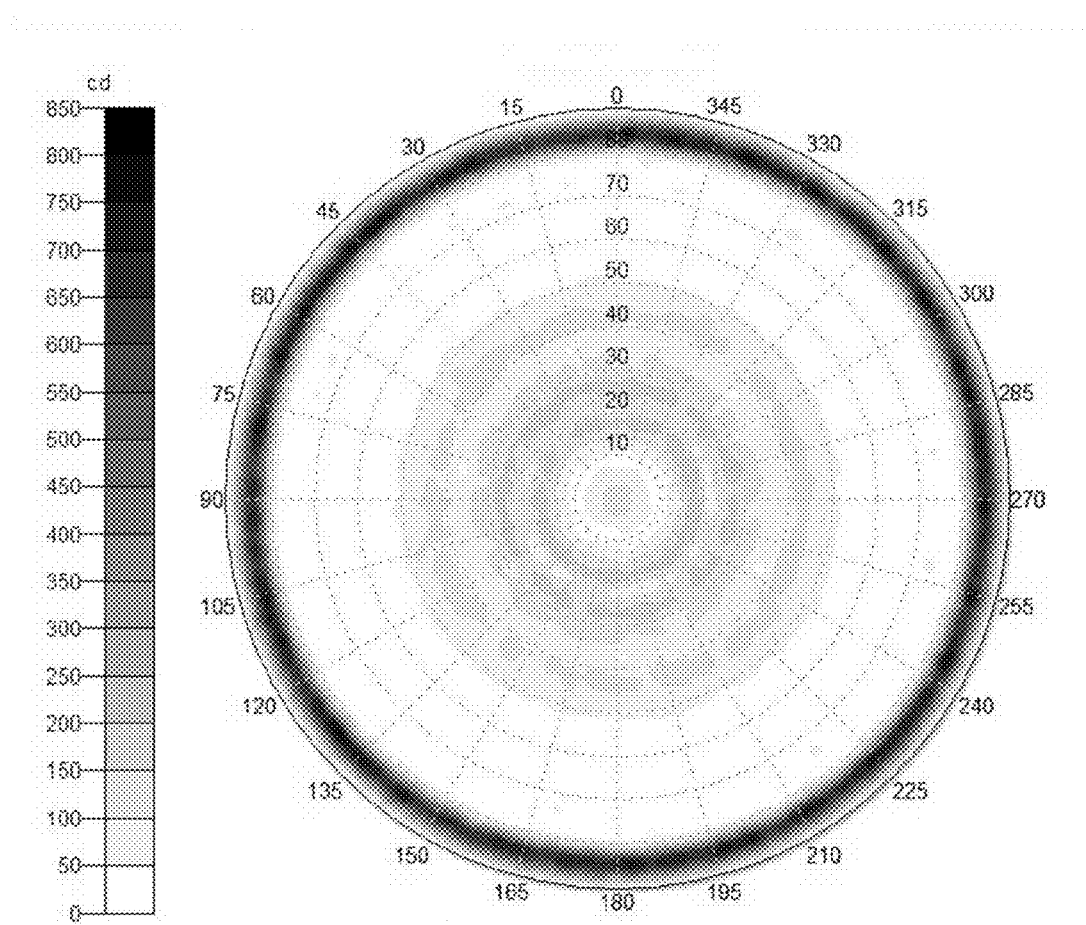
FIG. 9 presents a polar iso-illumination plot, as measured in Candela (cd), according to at least one embodiment of the present disclosure.

In operation of at least one embodiment of the present disclosure, the combined effect of all the optical elements 22 is to redirect a substantial majority of the light rays 26 emitted from LED 18 into a desired light distribution. FIG. 8 shows one possible light distribution that results from one embodiment of the present disclosure in the form of an iso-illumination plot, in which light intensity incident on a plane orthogonal to the lens longitudinal axis 25 and about 10 feet from the LED 18 is reported in Candela (cd). FIG. 9 shows another possible light distribution that results from an alternative embodiment of the present disclosure in the form of an iso-illumination plot, in which light intensity incident on a plane orthogonal to the lens longitudinal axis 25 and about 10 feet from the LED 18 is reported in Candela (cd). The differences between the light distributions shown in FIGS. 7 and 8 are indicative of the light control enabled by at least two embodiments of optical elements 22.

In at least one embodiment of the present disclosure, the interior and exterior optical surfaces 24A and 24B may be substantially smooth. In another embodiment of the present disclosure, the interior optical surface 24A may be substantially smooth and the exterior optical surface 24B may be slightly roughened, such that the exterior optical surface 24B is slightly diffuse. The exterior optical surface 24B may be slightly roughened by applying a surface treatment to a manufactured lens assembly 20 or lens halves 20A and 20B, or by applying a surface treatment to the tool used to mold, cast or otherwise fabricate the lens halves 20A and 20B. Said surface treatment may be designated as stipple, acid etch or the like. The slight diffuse exterior optical surface 24B provides gradual transitions in light intensity between each optical element 22 and a softer, more uniform visual appearance.

In at least one embodiment of the present disclosure, the at least one LED 18 is powered by a constant current electrical power source (not shown) to optimize its light output, power consumption, and life. To ensure such a power source, control electronics (not shown) may be electrically connected between the at least one LED 18 and the power supply. The power supply for the at least one LED 18 may be the public power grid (i.e., "on-grid") or an electrical storage battery (i.e., "off-grid"). In at least one embodiment of the present disclosure, the at least one LED 18 is powered at 1000 milliamps, consumes 3.2 Watts, and provides 220 total lumens of light. In at least another embodiment, the at least one LED 18 is powered at 277 milliamps and provides 1000 lumens. It is well-known that LEDs should not be powered beyond their maximum junction temperature. In at least one embodiment of the present disclosure, the color temperature of the at least one LED 18 is selected from a range of 2700-8300 Kelvin, depending on the desired illuminated effect.

Figure 10:
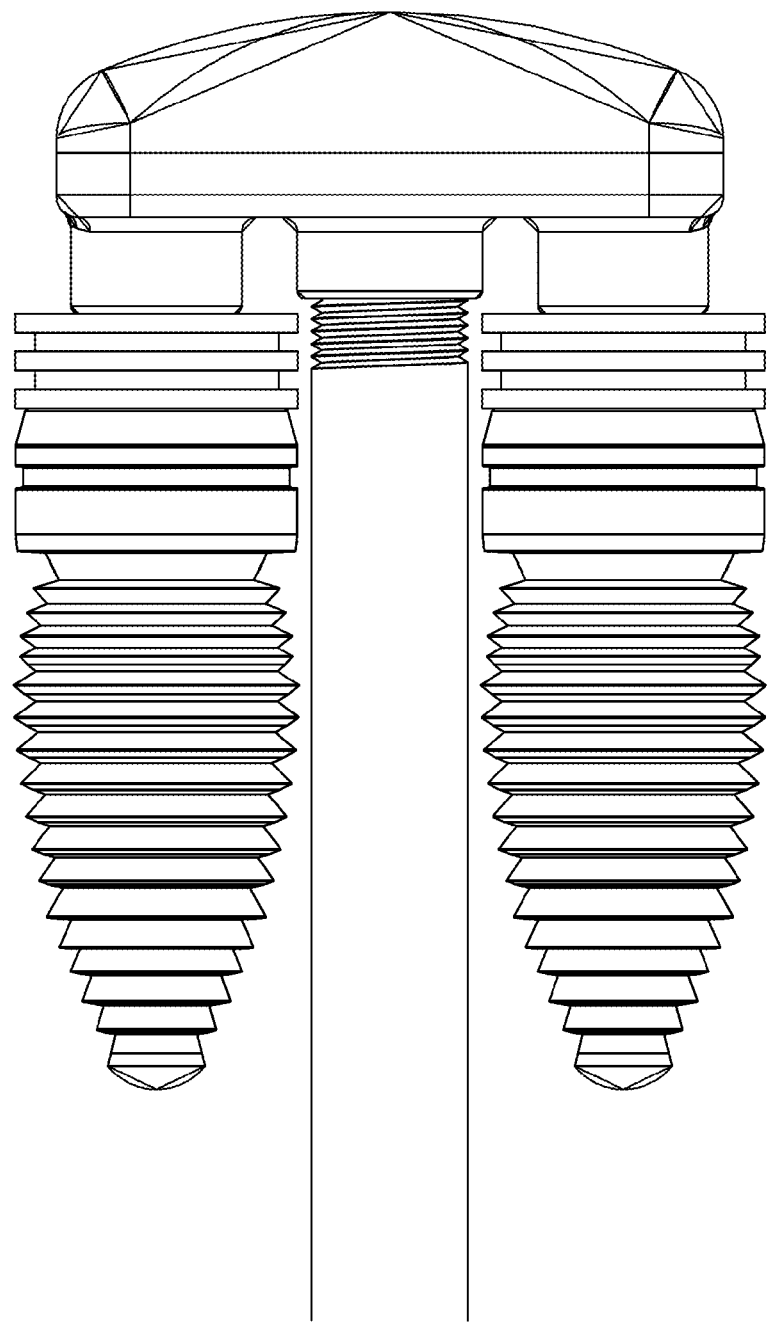
FIG. 10 shows a lighting fixture incorporating a LED light module with variable optic lens, according to at least one embodiment of the present disclosure.

In lighting fixture applications, the LED light module 10 may be used alone as a single light source for a lighting fixture, or a plurality of LED light modules 10 may be combined to increase the total light output of the lighting fixture. An example of a lighting fixture using multiple LED light modules 10, according to one embodiment of the present disclosure, is shown in FIG. 10.

Figure 11:
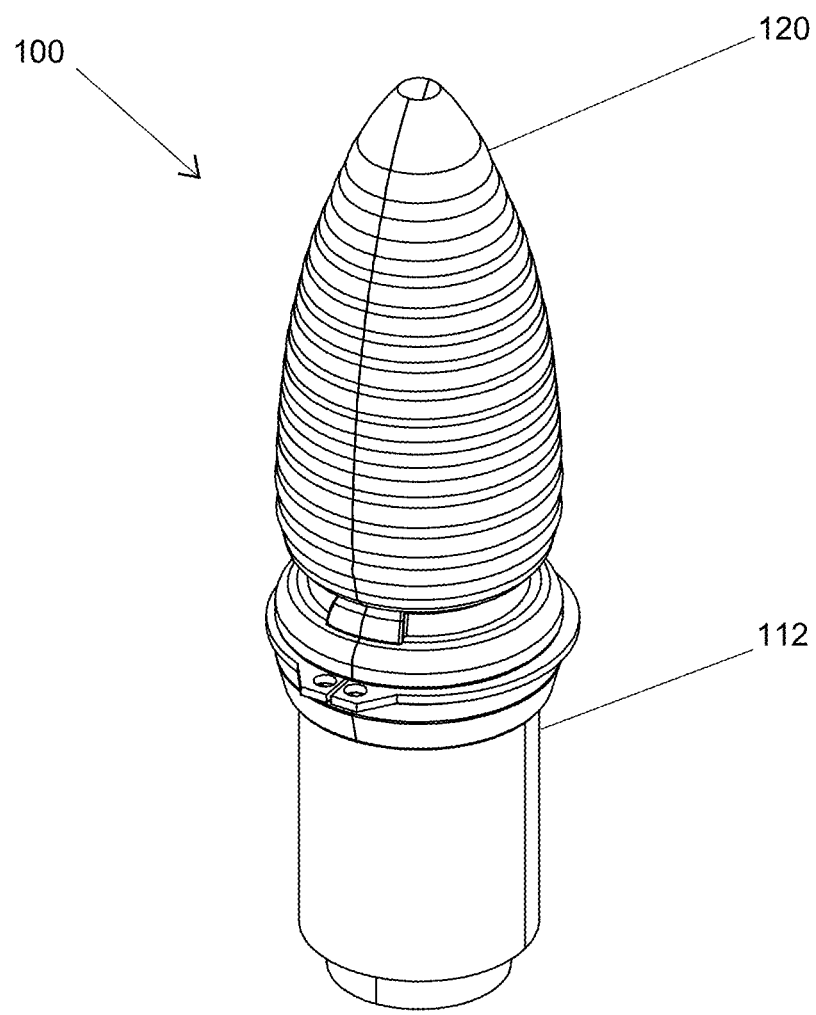
FIG. 11 shows an isometric view of a LED light module with variable optic lens, according to at least one embodiment of the present disclosure.

Another embodiment of a LED light module with a variable optic lens according to the present disclosure is shown in FIG. 11. As shown in FIG. 11, a LED light module 110 includes a heat sink 112, at least one light-emitting diode (LED) (not shown), and a variable optic lens assembly 120.

Figure 12:
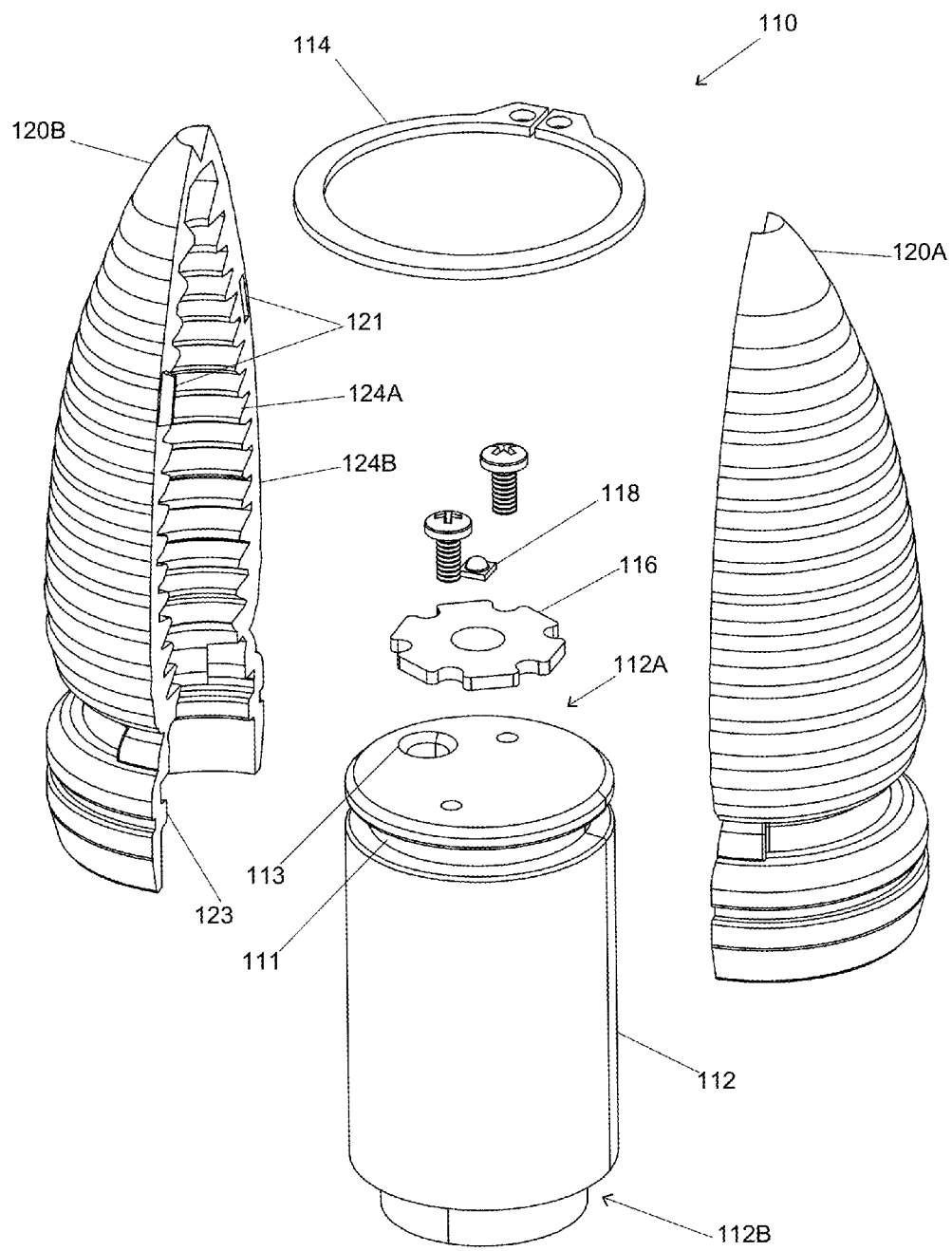
FIG. 12 shows an exploded isometric view of a LED light module with variable optic lens, according to at least one embodiment of the present disclosure.
Figure 13:
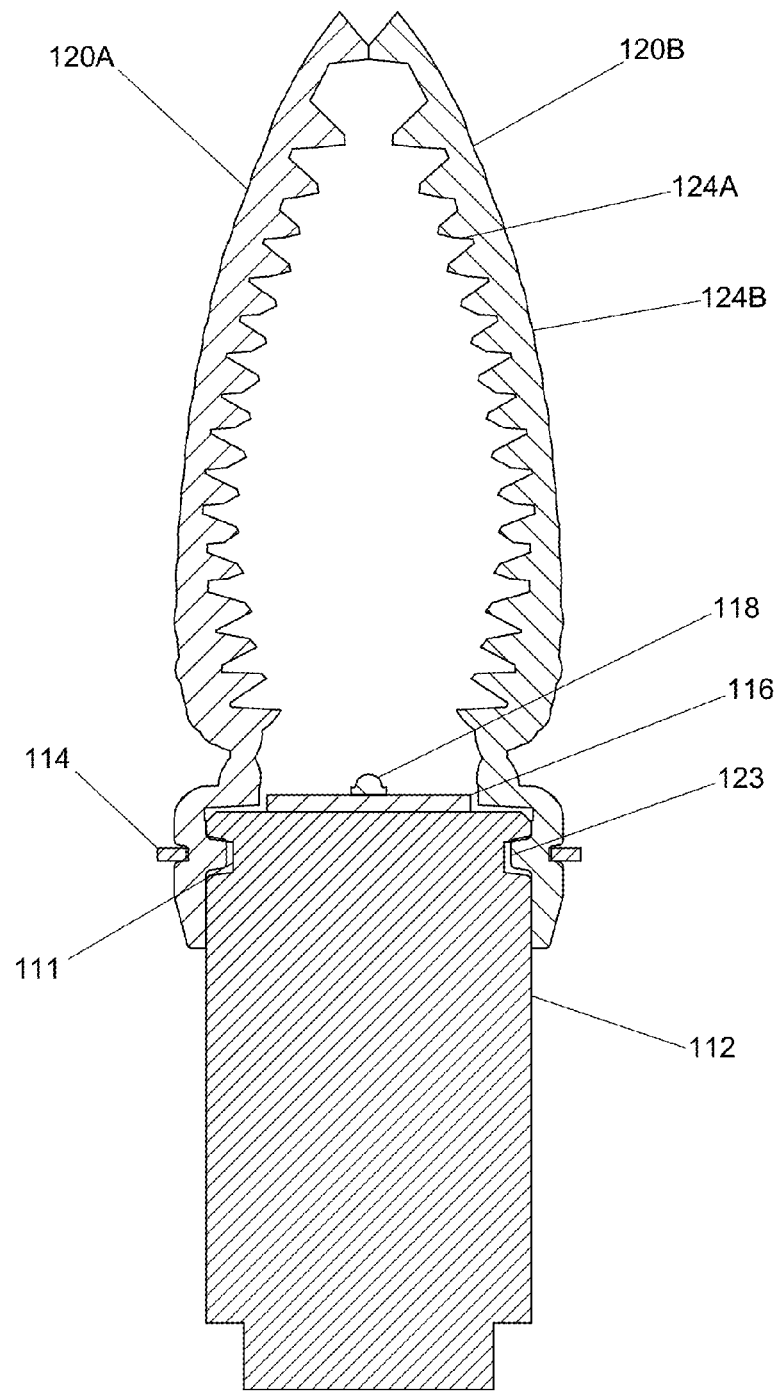
FIG. 13 shows a cross-sectional view of a LED light module with variable optic lens, according to at least one embodiment of the present disclosure.

In at least one embodiment of the present disclosure as shown in FIG. 12, the heat sink 112 includes a light source side 112A and a mounting side 112B, a locating feature 111, and a through hole 113. The light source side 121A of the heat sink 112 is configured to attach at least one LED 18 in thermal contact with the heat sink 112. The mounting side 112B of the heat sink 112 is configured to mount the heat sink 112 to a lighting fixture body (not shown) by a means of attachment, such as a threaded hole, one of more screws, structural adhesive, or other suitable means. The locating feature 111 is configured to properly position of the lens assembly 120 relative to the heat sink 112. In at least one embodiment of the present disclosure, the through hole 113 extends from the light source side 112A, through the body of the heat sink 112, to the mounting side 112B and is configured to enable passage of an electrical connection, such as twenty-gauge, seven-strand copper wire, from the at least one LED 118 on the light source side 112A to a power source (not shown) on the mounting side 112B. The heat sink 112 is made of a material that readily conducts heat, such as copper, aluminum, or other suitably conductive material, and may be manufactured by casting, forging, molding, machining, or other suitable process.

In at least one embodiment of the present disclosure, the at least one LED 118 includes a semiconductor chip having a light emitting p-n junction for generating light, an electrically isolated metal base or slug, a bottom surface that may be in contact with, or coated with, a reflective material to reflect generated light upward, and a means of electrical connection. In at least one embodiment, the at least one LED 118 is a high-output white light LED, such as the XP-G LED manufactured by Cree,™ Inc. In at least one embodiment of the present disclosure, the at least one LED 118 is in thermal and electrical contact with a circuit board 16 and is fixed in position on the circuit board 16 with a thermally conductive adhesive or similar means. The circuit board 116 is in thermal contact with the heat sink 112, enables an electrical connection between the LED 118 and a power source (not shown), and is comprised of a metal core to maximize heat transfer from the at least one LED 118 to the heat sink 112. The circuit board 116 is fixed to the heat sink 112 by a means of attachment (not shown), such as at least one machine screw, thermally conductive adhesive, or similar means.

In at least one embodiment of the present disclosure, the lens assembly 120 includes two halves, 120A and 120B. Each half 120A and 120B includes indexing features 121, a lens locating feature 123, and a plurality of optical elements 122, which define an interior optical surface 124A and an exterior optical surface 124B. The plurality of optical elements 122 will be discussed more fully with regards to FIGS. 14-16.

In at least one embodiment of the present disclosure, the indexing features 121 are configured to alignment of the halves 120A and 120B during assembly. The indexing features 121 may be further configured to enable the two halves 120A and 120B to be the same part. Consequently, the halves 120A and 120B may be molded or cast in the same mold or, alternatively, manufactured using the same process. Each half 120A and 120B of the lens assembly 120 may be secured together and held securely to the heat sink 112 by a retaining ring 114. The retaining ring 114 could be any suitable means for securing each half 120A and 120B together and to the heat sink 112, such as a metal spring-loaded clip or a plastic pull-tie. The lens assembly 120 may be positioned relative to the heat sink 112 by the at least one lens locating feature 123, which is configured to mate with the locating feature 111 on heat sink 112, thereby properly positioning the optical elements 122 of the lens assembly 120 relative to the at least one LED 118 to maximize the efficacy of the module 110.

In at least one embodiment of the present disclosure, each half 120A and 120B of the lens assembly 120 is made of a substantially optically transparent material, including but not limited to glass, cyclic olefin copolymer (COC), polymethylmethacrolate (PMMA), polycarbonate (PC), PC/PMMA composite, silicones, fluorocarbon polymers, and polyetherimide (PEI), having an index of refraction ranging from between about 1.35 to about 1.7. In at least one embodiment of the present disclosure, the lens' index of refraction may be about 1.53 but may be higher or lower based on the material selected for a given embodiment. The volume of space within the lens assembly 120 is comprised of ambient air, having an index of refraction of approximately 1.0003.

Figure 14:
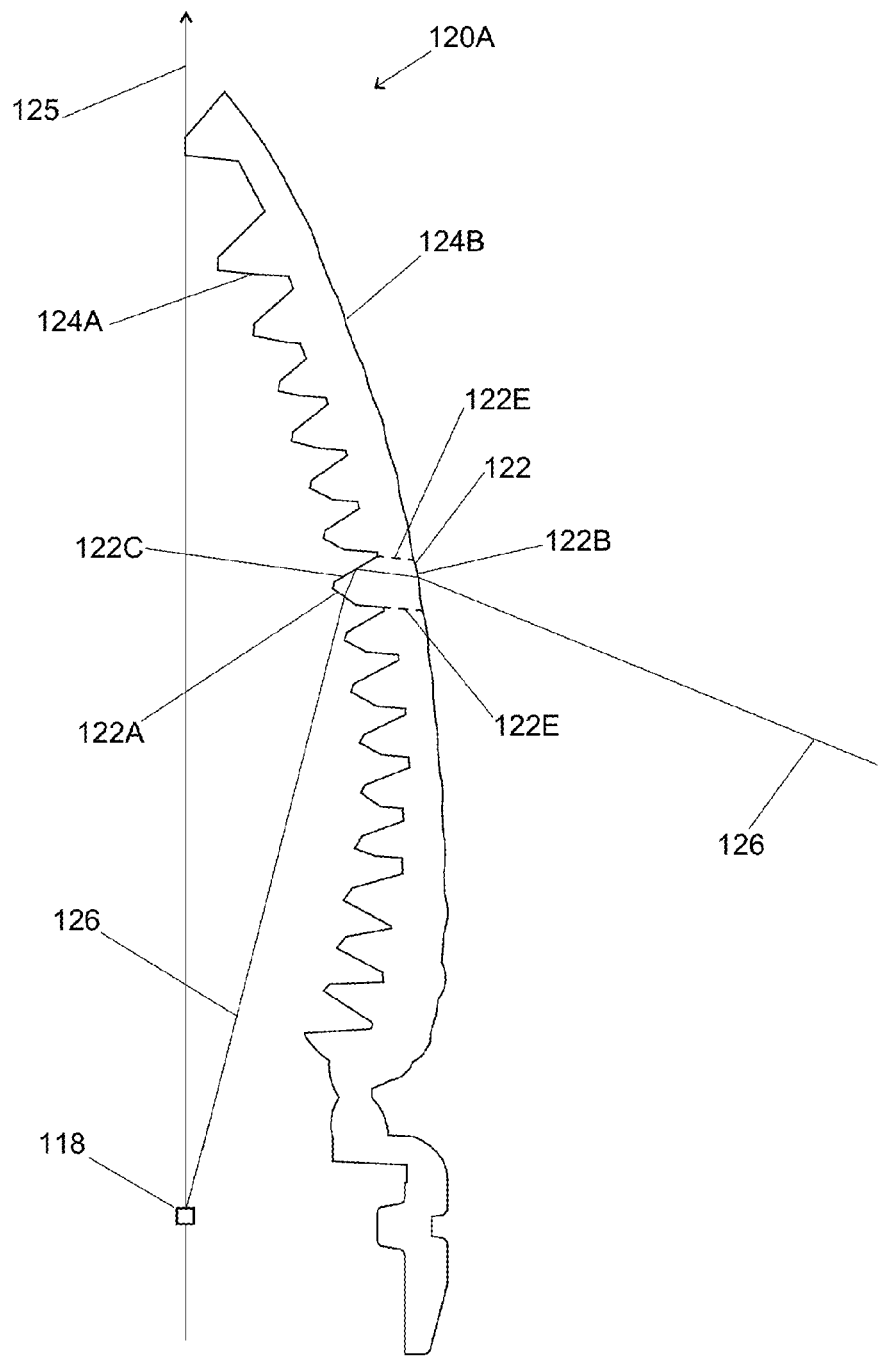
FIG. 14 illustrates ray traces from a LED light source and a lens, according to at least one embodiment of the present disclosure.

An exemplary embodiment of a LED light module with a variable optic lens according to the present disclosure is shown in FIG. 14. As shown in FIG. 14, each lens half 120A and 120B is defined by an interior optical surface 124A and an exterior optical surface 124B. The interior optical surface 124A is further defined by a plurality of interior facets 122A and 122C, such that each optical element 122 has at least one interior facet 122A and at least one interior facet 122C. The exterior optical surface 124B is further defined by a plurality of exterior facets 122B, such that each optical element 122 has at least one exterior facet 122B. Thus, a given optical element 122 is defined by its interior facets 122A and 122C, its exterior facet 122B, and imaginary surfaces 122E connecting the corners of its interior facets to the corresponding corners of its exterior facet 122B.

Figure 15:
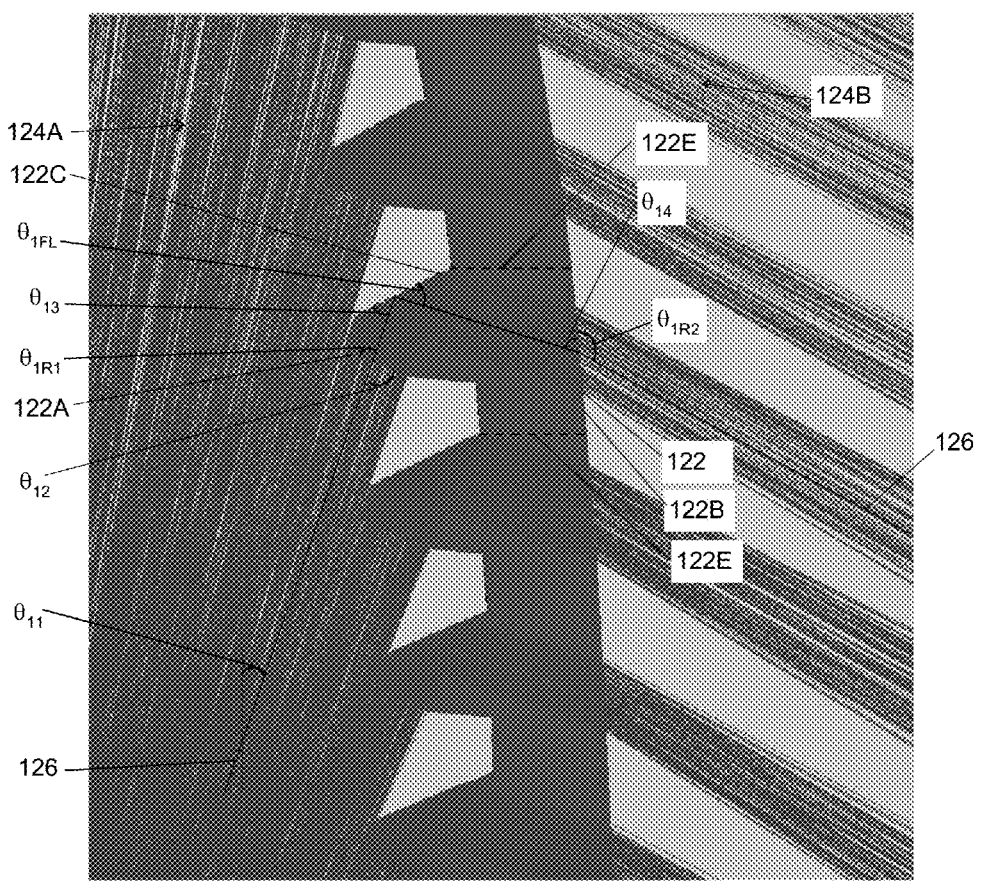
FIG. 15 illustrates detailed ray traces of a lens, according to at least one embodiment of the present disclosure.

In at least one embodiment of the present disclosure, the plurality of first interior facets 122A are refracting surfaces, the plurality of second interior facets 122C are internally reflecting surfaces, and the plurality of exterior facets 122A are refracting surfaces. As shown in FIG. 15, an exemplary light ray 126 is emitted from the at least one LED 118 at an angle $\theta_{11}$ relative to the lens longitudinal axis 125. The light ray 126 is incident upon the exemplary first interior facet 122A at angle $\theta_{12}$ relative to the interior optical surface 124A at the point of intersection. The interior facet 122A refracts the light ray 126 according to Snell's Law, which in this exemplary case is:

$$n_1 \sin(90°-\theta_{12}) = n_{120} * \sin(90°-\theta_{1R1}),$$

where $n_1$ is the refractive index of air and $n_{120}$ is refractive index of the material comprising the lens assembly 120.

Consequently, the light ray 126 proceeds from the interior facet 122A at a first angle of refraction $\theta_{1R1}$ relative to the interior optical surface 124A at the point of intersection. The light ray 126 proceeds through the body of the optical element 122 until falling incident upon the second interior facet 122C at an angle $\theta_{13}$ relative to the surface of the second interior facet 122C at the point of intersection. The first and second interior facets 122A and 122C are configured such that a light ray 126 incident on the second interior facets 122C will be substantially internally reflected by the second interior facet 122C at an angle $\theta_{1FL}$ according to simple geometry, such that:

$$\theta_{13} = \theta_{1FL}.$$

Upon reflection by the second interior facet 122C, the light ray 126 continues through the body of the exemplary optical element 122 until falling incident upon the exterior facet 122B at angle $\theta_{14}$ relative to the exterior optical surface 124B at the point of intersection. The first interior facet 122A, the second interior facet 122C, and the exterior facet 122B are configured such that a light ray 26 incident on the exterior facet 122B will be refracted by the exterior facet 122B. As a result, the exterior facet 122B further refracts light ray 126, which exits the optical element 122 at a second angle of refraction $\theta_{1R2}$ according to Snell's Law, which in this exemplary case is:

$$n_{120}*\sin(90°-\theta_{14})=n_1*\sin(\theta_{1R2}-90°)$$

Figure 16A:
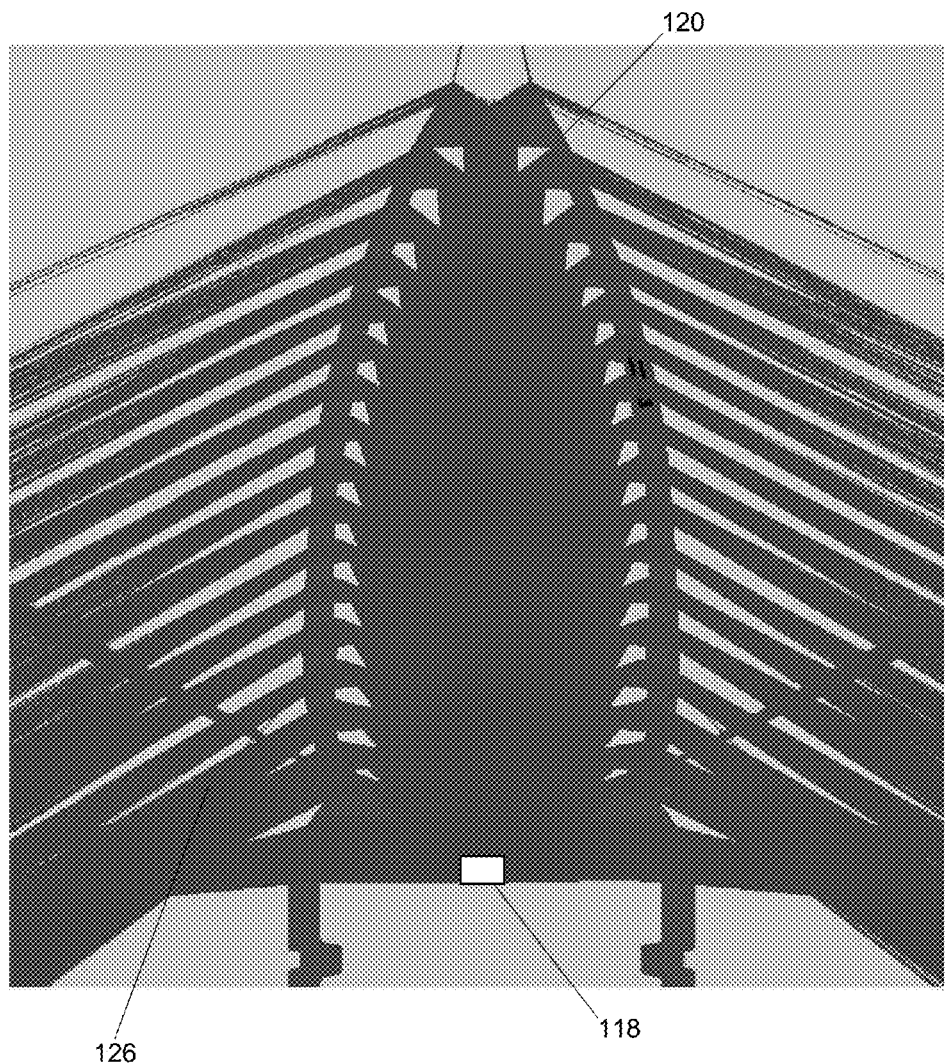
FIGS. 16A and 16B illustrate composite ray traces for a LED light module with variable optic lens, according to at least one embodiment of the present disclosure.
Figure 16B:
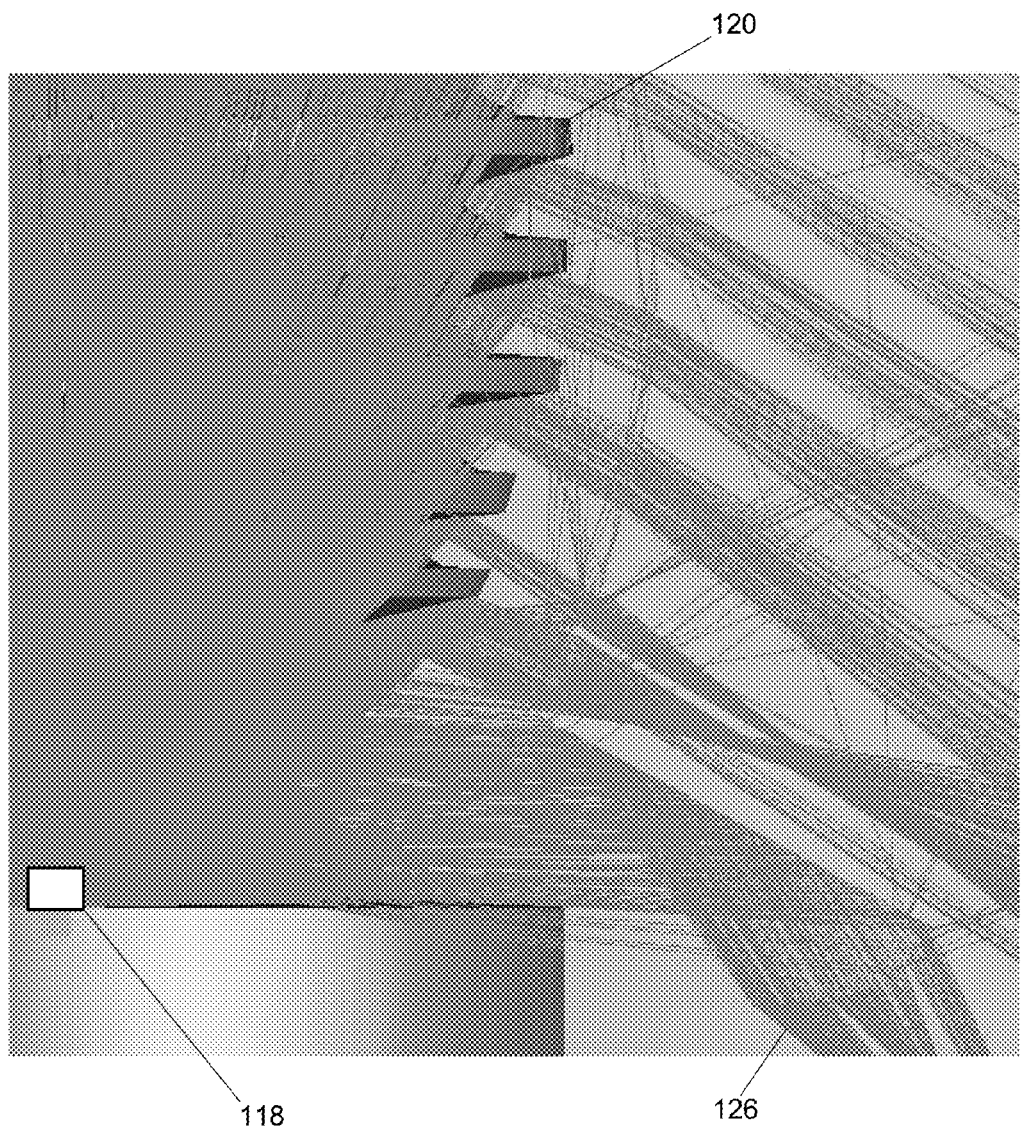

In at least one embodiment of the present disclosure, each of the plurality of first interior facets 122A is configured to refract the light ray 126 at a different first angle of refraction $\theta_{1R1}$. Likewise, each of the plurality of second interior facets 122C is configured to reflect the light ray 126 at a different first angle of reflection $\theta_{1FL}$. Furthermore, each of the plurality of exterior facets 122B is configured to refract the light ray 126 at a different second angle of refraction $\theta_{1R2}$. Therefore, the facets 122A, 122B, and 122C are further configured to cooperatively refract and reflect the light ray 126 to a desired angle of illumination, that being $\theta_{1R2}$. In at least one embodiment of the present disclosure, the angle $\theta_{1R2}$, resulting from each optical element 22, is such that substantially all light rays 126 are refracted at an angle below a horizontal plane, meaning greater than 90 degrees from the lens longitudinal axis 125, as shown in FIGS. 16A and 16B. In at least one embodiment, the lens assembly 120 is capable of directing light rays greater than 270 degrees from optical axis of the LED 118 and is limited only by the width of the heat sink 112.

Figure 17:
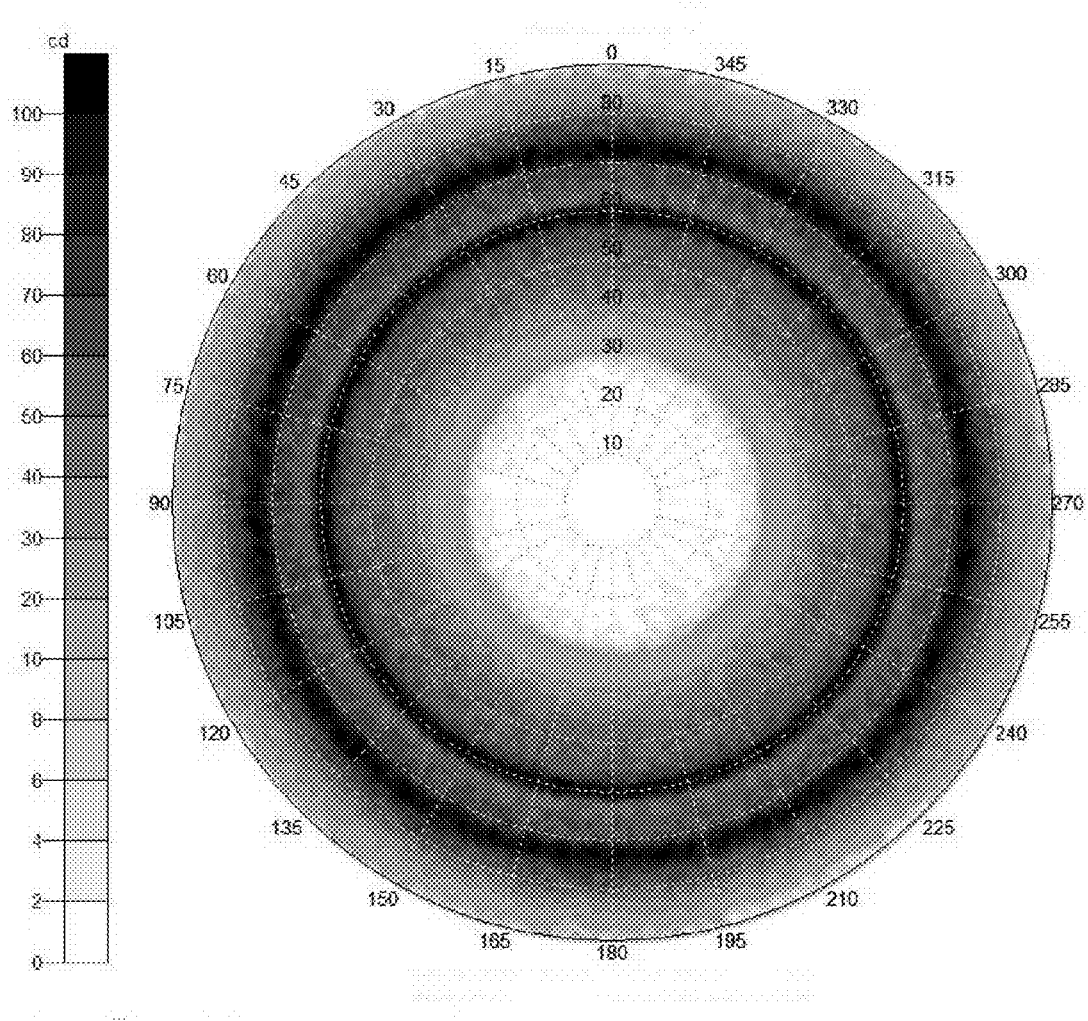
FIG. 17 presents a polar iso-illumination plot, as measured in Candela (cd), according to at least one embodiment of the present disclosure.

FIG. 17 shows one possible light distribution that results from one embodiment of the present disclosure in the form of an iso-illumination plot, in which light intensity incident on a plane orthogonal to the lens longitudinal axis 125 and about 10 feet from the LED 118 is reported in Candela (cd). In at least one embodiment of the present disclosure, the interior and exterior optical surfaces 124A and 124B may be substantially smooth or polished. In another embodiment of the present disclosure, the interior optical surface 124A may be substantially smooth or polished, and the exterior optical surface 124B may be slightly roughened, such that the exterior optical surface 124B is slightly diffuse. The exterior optical surface 124B may be slightly roughened by applying a surface treatment to a manufactured lens assembly 120 or lens halves 120A and 120B, or by applying a surface treatment to the tool used to mold, cast or otherwise fabricate the lens halves 120A and 120B. Said surface treatment may be designated as stipple, acid etch or the like. The somewhat diffuse exterior optical surface 124B provides gradual transitions in light intensity between each optical element 122 and a softer, more uniform visual appearance.

Figure 30:
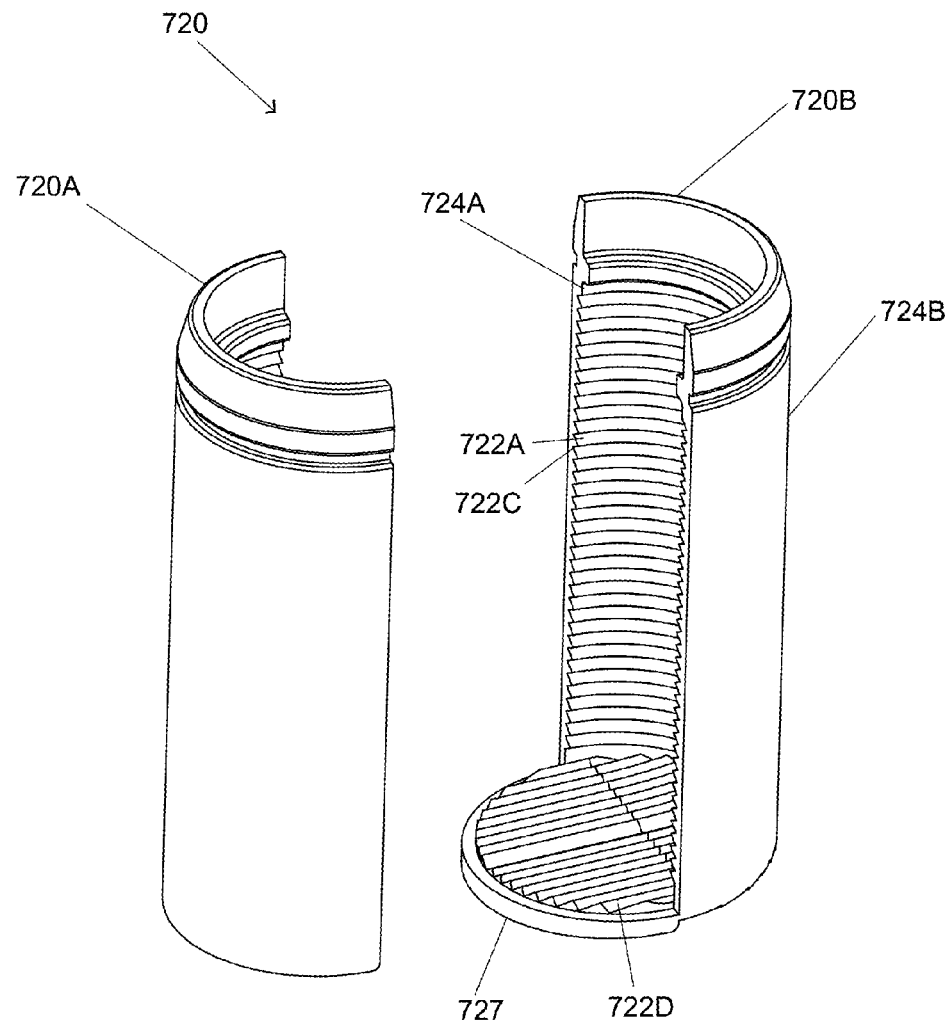
FIG. 30 shows an exploded isometric view of a variable optic lens assembly, according to at least one embodiment of the present disclosure.

Another embodiment of a LED light module with a variable optic lens according to the present disclosure is shown in FIG. 30. As shown in FIG. 30, each lens half 720A and 720B of a tubular lens 720 is defined by an interior optical surface 724A and an exterior optical surface 724B. The interior optical surface 724A is further defined by a plurality of interior facets 722A and 722C. The plurality of first interior facets 722A are refracting surfaces, the plurality of second interior facets 722C are internally reflecting surfaces, and the exterior surface 724B is a refracting surface as described herein and similar to as shown in FIG. 15. The exterior optical surface 724B may be substantially smooth or polished, or the exterior optical surface 724B may be slightly roughened to slightly diffuse the light as described herein. To further increase the efficacy of the lens, additional optical facets 722D, formed in the disk-shaped floor 727 of the tubular lens 720, redirect the near-perpendicular light from the LED 118 at angles great enough to avoid incidence with the fixture. Moreover, because of the tubular shape of the lens 720, the combined optics 722A, 722C, 722D, 724B produce a visual effect making the lens glow with the appearance of an upside-down flame. That is, to an observer some distance from the lamp assembly, that portion of the lens closest to the LED 118 glows across the full width of the lens while the width that appears to glow decreases down the length of lens. The resulting flame-like appearance is particular appealing in applications were the lamp assembly is used to replace a natural gas-powered lamp that burns gas either as an open flame or in a mantle.

In at least one embodiment of the present disclosure, the at least one LED 118 is powered by a regulated constant current electrical power source (not shown) to optimize its light output, power consumption, and life of the system. To ensure such a power source, control electronics (not shown) may be electrically connected between the at least one LED 118 and the power supply. The power supply for the at least one LED 118 may be the public power grid (i.e., "on-grid") or an electrical storage battery (i.e., "off-grid"). In at least one embodiment of the present disclosure, the at least one LED 118 is powered at 1000 milliamps, consumes 3.2 Watts, and provides 220 total lumens of light. In at least another embodiment, the at least one LED 18 is powered at 277 milliamps and provides 1000 lumens. In at least one embodiment of the present disclosure, the color temperature of the at least one LED 18 is selected from a range of 2700-8300 Kelvin, depending on the desired illuminated effect.

Figure 18:
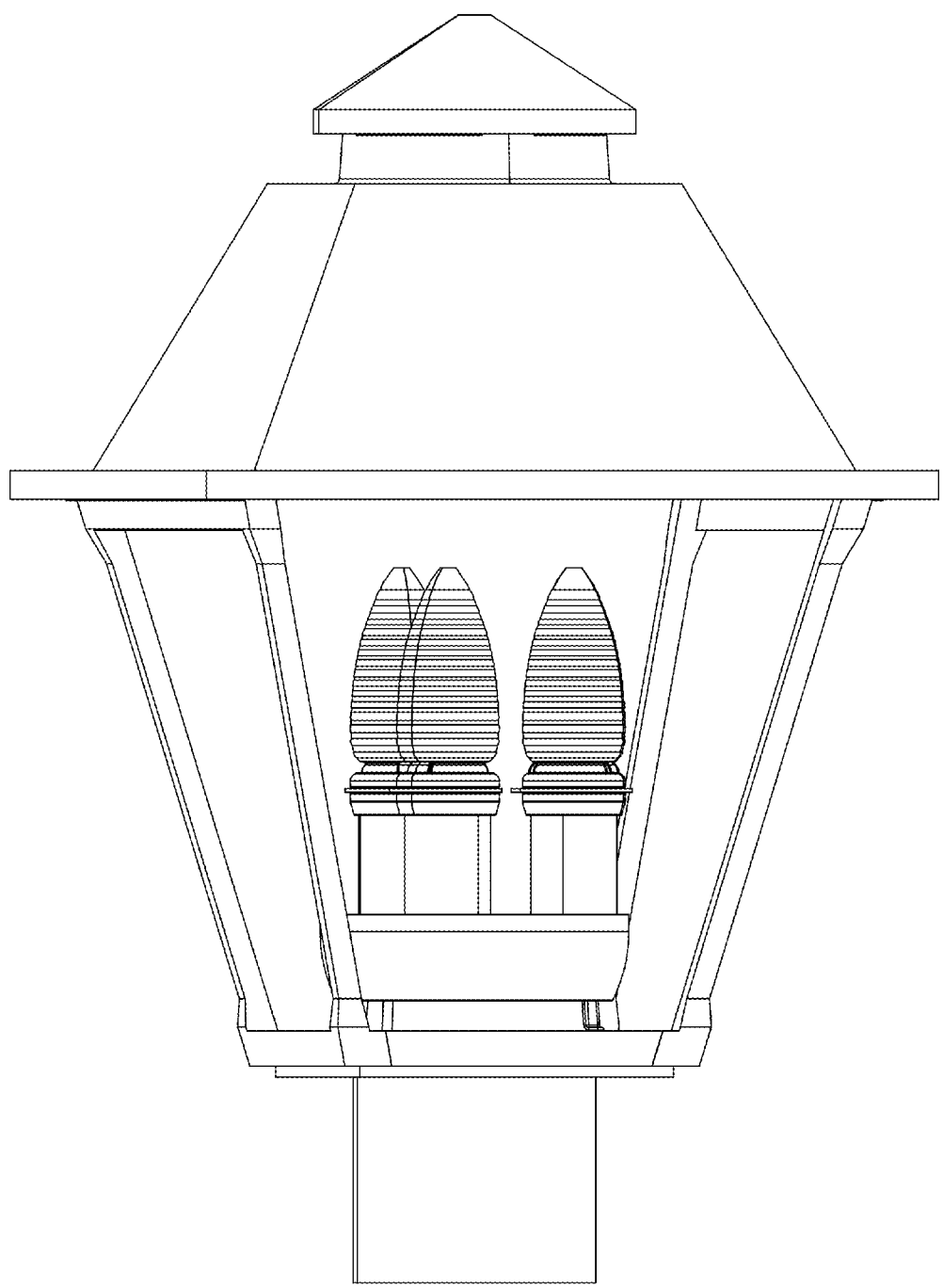
FIG. 18 shows a lighting fixture incorporating a LED light module with variable optic lens, according to at least one embodiment of the present disclosure.
Figure 19A:
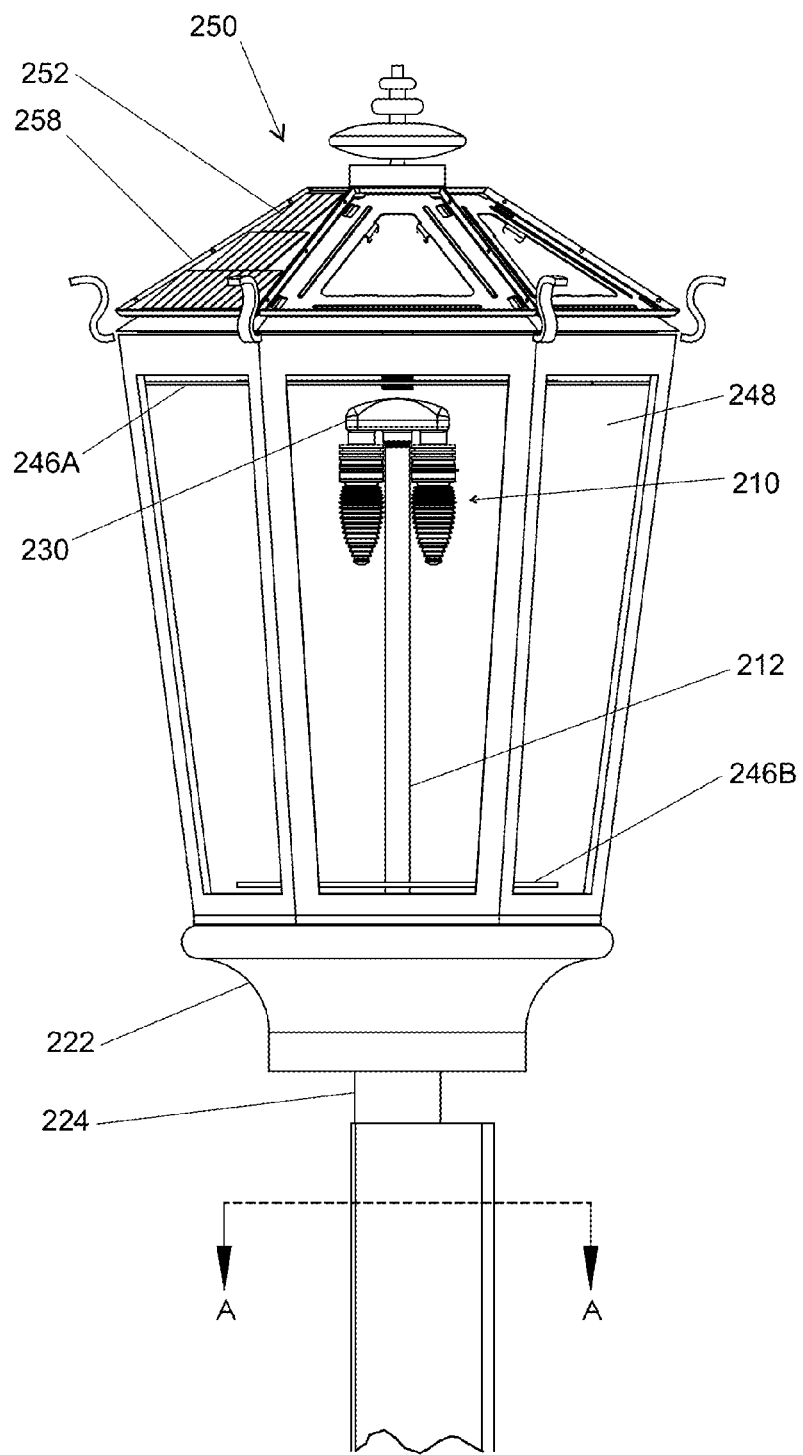
FIG. 19A shows a solar-powered lighting fixture incorporating a LED light module with variable optic lens, according to at least one embodiment of the present disclosure.

In lighting fixture applications, the LED light module 110 may be used alone as a single light source for a lighting fixture, or a plurality of LED light modules 110 may be combined to increase the total light output of the lighting fixture. An example of a lighting fixture using multiple LED light modules 110, according to at least one embodiment of the present disclosure, is shown in FIGS. 10 and 18.

Where an embodiment of the LED light module 10, 110 is used off-grid, it is advantageous to include the LED light module 10, 110 as a part of an integrated lighting fixture capable of utilizing a rechargeable battery for a power source without using an on-grid electrical power supply. An exemplary embodiment of a solar-powered LED module and lighting fixture according to the present disclosure is shown in FIG. 19A. As shown in FIG. 19A, a solar-powered LED lighting fixture 200 may include at least one LED light module 210 positioned within a lamp fixture 222, which may be mounted on a lamppost 224. In at least one embodiment, the LED light module 210 may include the construction as shown in FIG. 1 or 12 and may be supported by a tubular module post 212, which also enables electrical connections between the LED module 210 and other operable parts of the fixture 200. In at least one embodiment, the tubular module post 212 may extend from the base to the top of the lamp fixture 222.

A solar-powered LED lighting fixture 200 further includes a solar panel array 250, a control circuit board 260, and a rechargeable battery 228, wherein the solar panel array 250 is electrically connected to the control circuit board 260, which is also electrically connected to the rechargeable battery 228 and the LED module 210. In at least one embodiment of the present disclosure, the solar panel array 250 includes at least one solar panel 258, which in turn includes an arrangement of a plurality of photovoltaic cells 252 electrically connected in either series or parallel to generate sufficient voltage and current to charge the rechargeable battery 228. The photovoltaic cells 252 operate to convert solar radiation into direct current electricity using semiconductor materials known to exhibit the photovoltaic effect, whereby photons of light (e.g., from solar radiation) excite electrons in the semiconductor to a higher state of energy, allowing them to act as charge carriers for an electric current. The photovoltaic cells 252 may be made of materials such as monocrystalline silicon, polycrystalline silicon, amorphous silicon, cadmium telluride, copper indium gallium selenide/sulfide, and the like.

The solar panel 258 may be formed to complement the contour or appearance of the lamp fixture 222, resulting in an aesthetically pleasing appearance. Moreover, a plurality solar panels 258 may be electrically connected to the control circuit 260 individually or as a panel array 250 in which the panels are first electrically connected one another (in series or in parallel) with a single connection to the control circuit 260. The former configuration enables the control board 260 to monitor the output of each panel separately. In at least one embodiment according to the present disclosure, solar panels 258 can be positioned along the lamppost 224 as shown in FIG. 19B.

In at least one embodiment according to the present disclosure, the rechargeable battery 228 may include a plurality of battery cells electrically connected to each other in series, parallel, or a combination of the two to form a single rechargeable battery 228. The use of a plurality of battery cells may reduce the overall manufacturing cost of the system 200. The rechargeable battery 228 may use any of the various chemistries available and known rechargeable battery technologies, including, but not limited to, lithium iron phosphate (LiFePO4), nickel-metal hydride (NiMH), or lithium-ion (Li-ion).

Figure 19B:
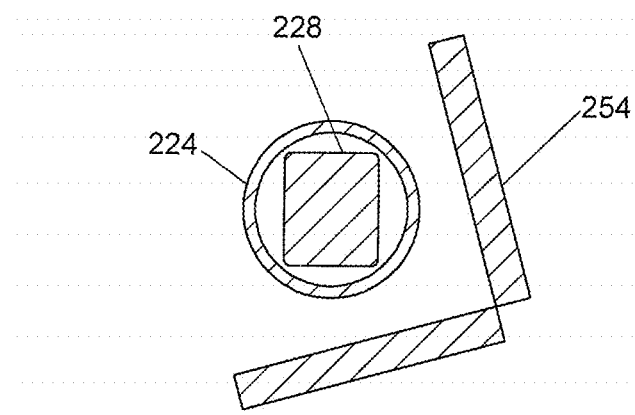
FIG. 19B shows a cross-sectional view of a battery pack at a plane A-A for a solar-powered LED lighting fixture, according to at least one embodiment of the present disclosure.
Figure 20:
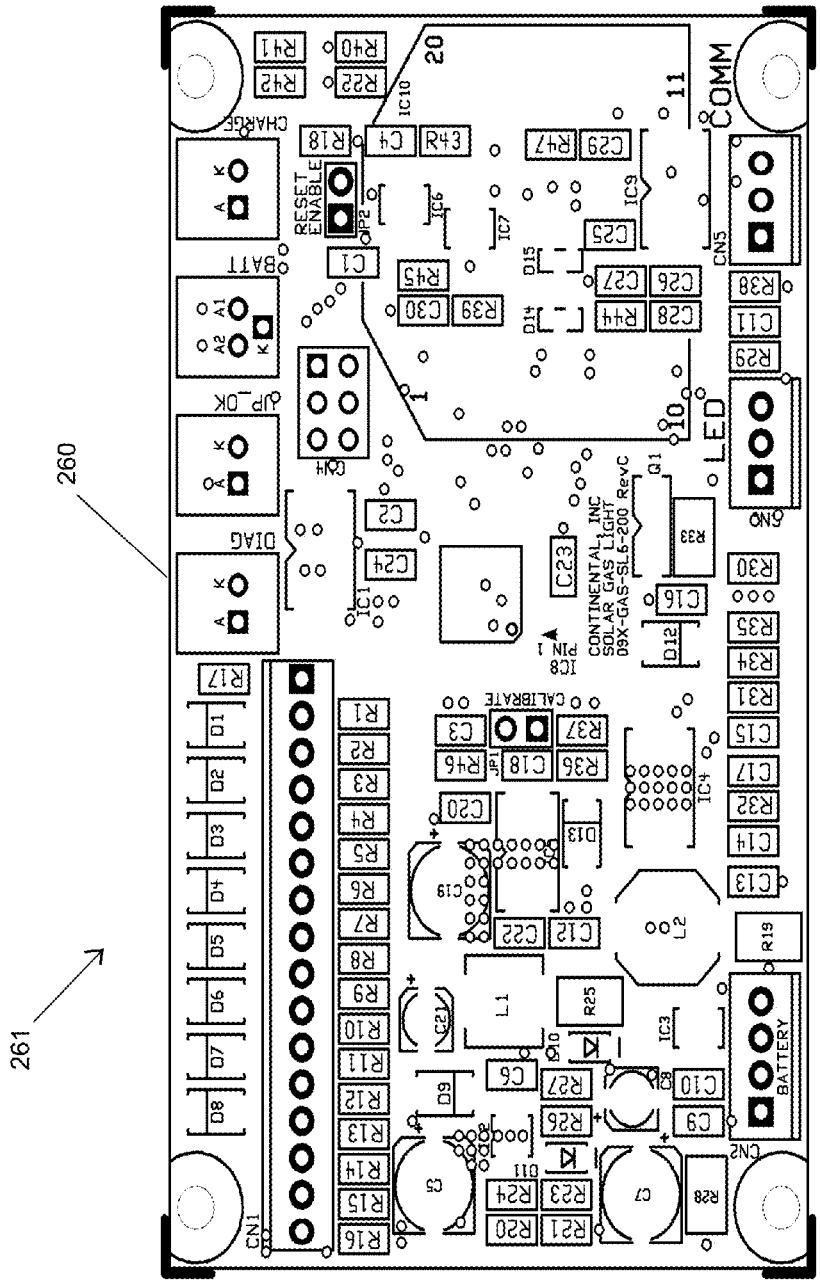
FIG. 20 shows a control circuit board for a solar-powered LED lighting fixture, according to at least one embodiment of the present disclosure.
Figure 21:
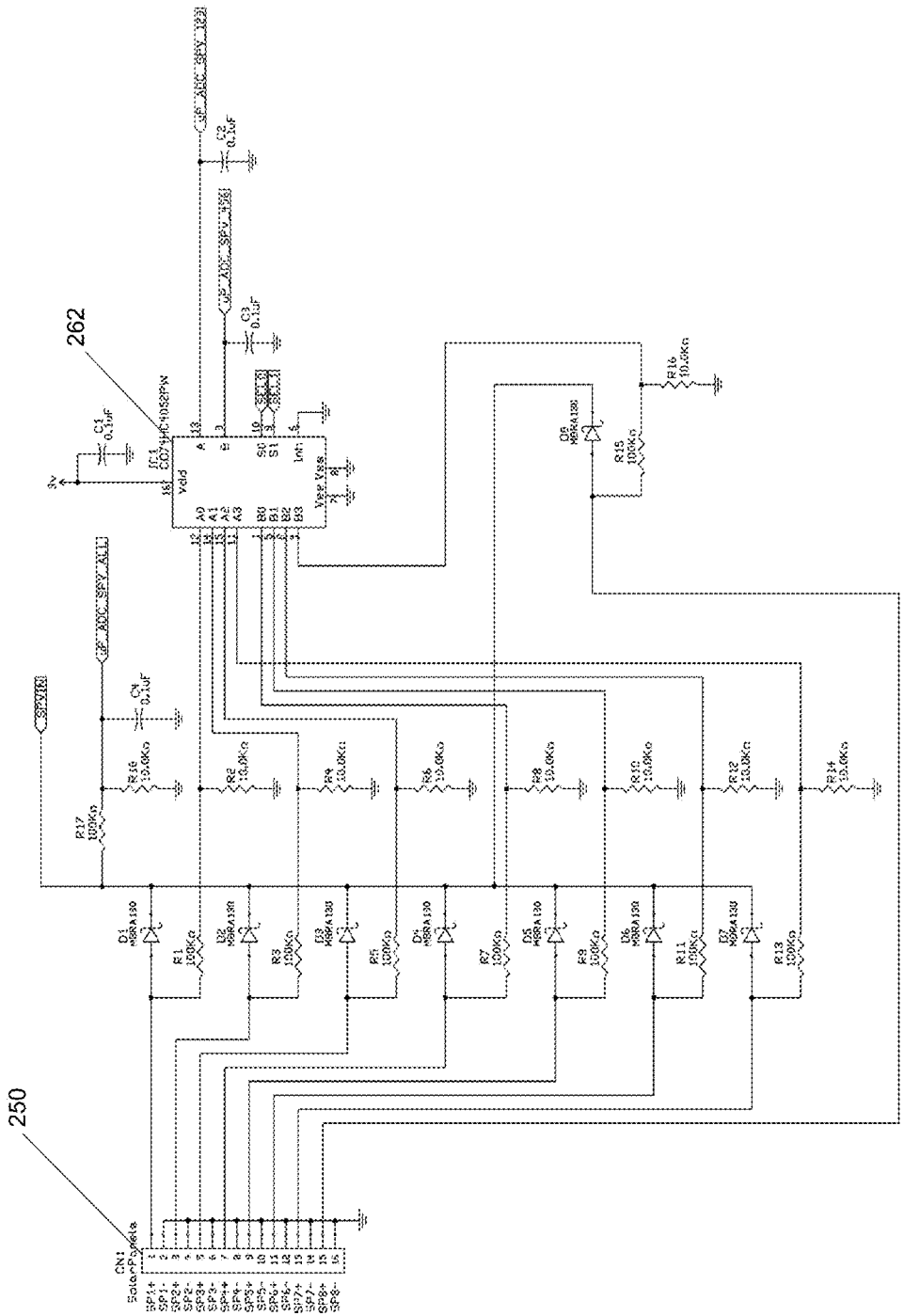
FIGS. 21, 22, 23, and 24 show schematics of the control circuitry for a solar-powered LED lighting fixture, according to at least one embodiment of the present disclosure.
Figure 22:
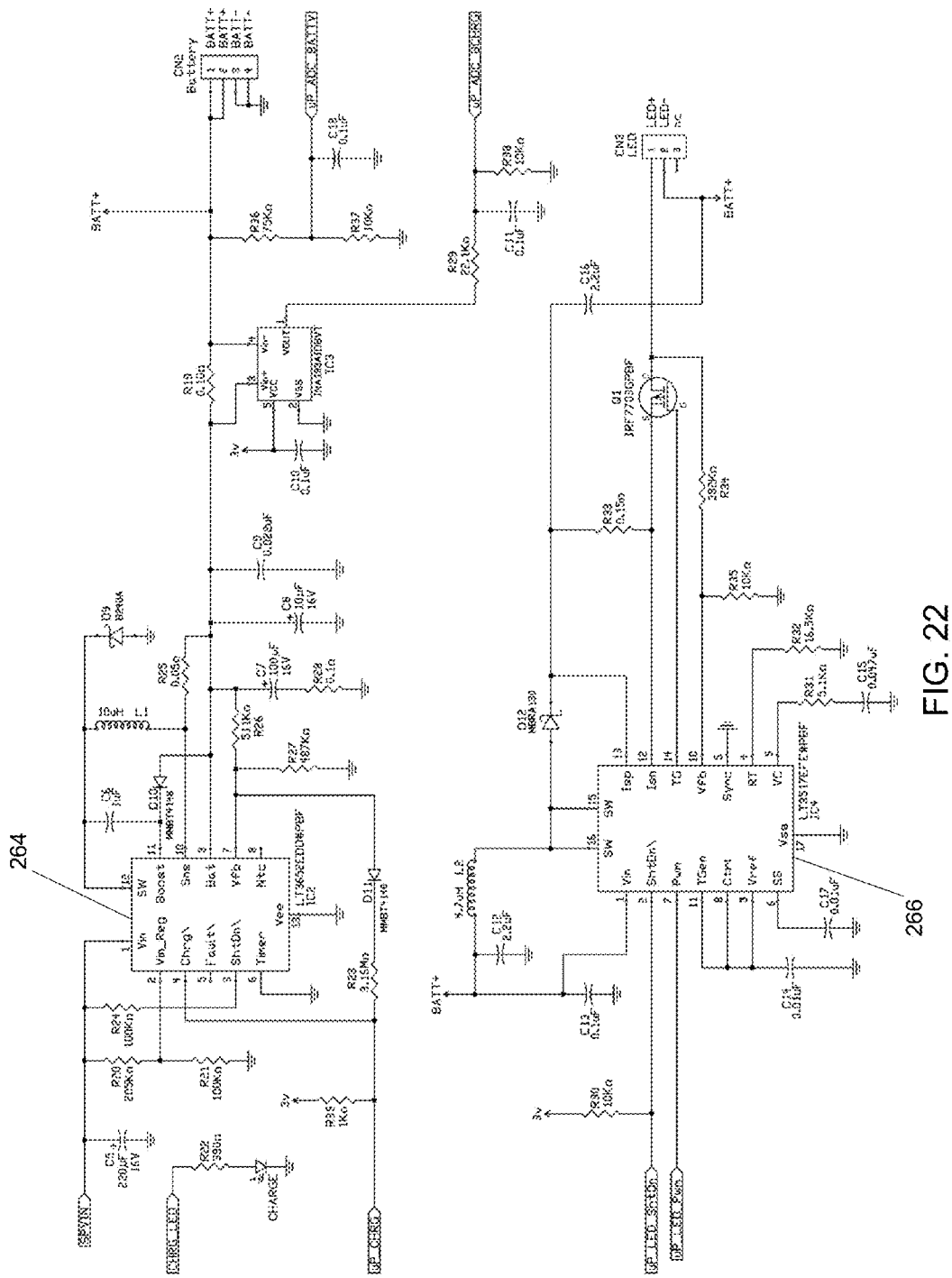

As shown in FIG. 19A, the rechargeable battery 228 may be positioned within the lamp fixture 222, hidden from view by either an upper reflector 246A or a lower reflector 246B, or within the lamppost 224 as shown in section FIG. 19B. The upper reflector 246A and lower reflector 246B may be positioned within the lamp fixture 222 above and below the LED module 210 and are capable of reflecting and dispersing light emitted by the LED module 210. Because they are positioned within the lamp fixture 222, the reflectors 246A, 246B may be formed to the shape of the perimeter of the inner edges of the lamp fixture 222. In at least one embodiment, the profiles of reflectors 246A and 246B may be curved or angled to reflect light primarily in a downward direction. Nonetheless, in at least one embodiment flat reflectors 246A and 246B are well-suited for reflecting the light downward to the ground to be illuminated and not scattered toward the sky, which results in light pollution.

In at least one embodiment according to the present disclosure, the lamp fixture 222 may include at least one transparent or substantially transparent window 248 positioned at the periphery of the fixture and capable of protecting the internal components, such as the LED module 210, from direct environmental exposure while also allowing light emitted by the LED module 210 to pass through to the ambient environment.

In at least one embodiment according to the present disclosure, the control circuit board 260 is positioned within the lamp fixture 222 and is housed inside a control box 230. The control box 230 may be a water-tight enclosure capable of protecting the control circuit board 260 from environmental exposure, such as moisture and dust. Moreover, the control box 230 includes openings to enable electrical connections between at least the control circuit board 260, the LED module 210, the solar panel array 250, and the rechargeable battery 228. Further, the openings in the control box 230 are sealed against environmental exposure. The control box 230 may be positioned anywhere within the lamp fixture 222, including adjacent the LED module 210 as shown in FIG. 19A. As further protection from environmental exposure, the circuit board 260 may be sealed by a conformal coating. Many chemistries of conformal coating materials are possible, including acrylic, epoxy, polyurethane, silicones, and amorphous fluoropolymer.

Figure 23:
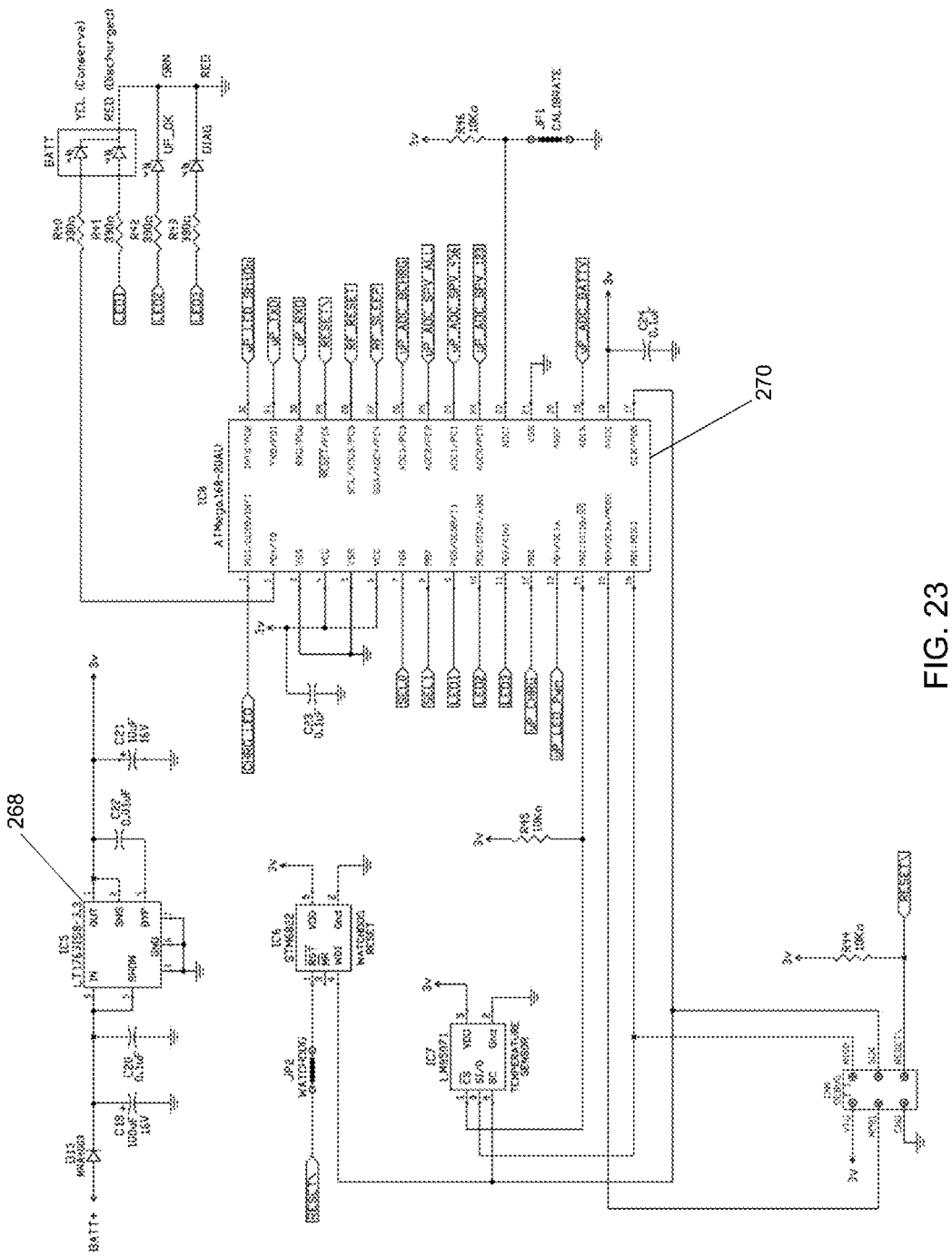

In at least one embodiment according to the present disclosure, the control circuit board 260 includes control circuitry 261, as shown in FIGS. 20-24, which enables power management functions for automatic power control for the LED module 210 and battery management functions for the interface between the panel array 250 and the rechargeable battery 228. As shown in FIG. 23, the control circuit board 260 includes a microprocessor 270, which executes the control algorithms required to optimize operational performance and govern the control circuitry 261. The control circuitry 261 enables automatic on-off control, which activates the LED module 210 when the ambient light is below a prescribed level (i.e., dusk) and deactivates the LED module 210 when the ambient light is above a prescribed level (i.e., dawn), by monitoring the voltage of panel array 250. In at least one embodiment according to the present disclosure, the control circuitry 261 includes a timer function that allows for a more complex power profile than simply on or off as further described herein. The control circuitry 261 may further include a constant current controller 266 that regulates the power provided to the LED module 210 by the rechargeable battery 228 at a prescribed current level, which is required to protect and optimize the reliability of the LED module 210.

In at least one embodiment according to the present disclosure, the control circuitry 261 includes battery management functions capable of optimally charging the rechargeable battery 228 to both enable maximum power storage and prevent excessive discharging that would reduce battery life. These battery management functions include a charge controller 264 and LED power control. In at least one embodiment according to the present disclosure, the charge controller 264 is capable of maximizing the total charge stored in the rechargeable battery 228 by adjusting the operating voltage of the panel array 250 independent of the voltage of the rechargeable battery 228. To achieve this result, the charge controller 264 uses a maximum power point tracking (MPPT) circuit to maximize the power delivered to the rechargeable battery 228 by the panel array 250. The operation and function of MPPT circuits are well-known. During a charging cycle when the solar array 250 is producing electrical power, the MPPT circuit adjusts the charge current supplied to the rechargeable battery 228 in accordance with variations in the operating voltage of the panel array 250 to maximize the charging power provided to the rechargeable battery 228. Without the charge controller 264, the panel array 250 will operate at the voltage of the battery 228, which is most likely not the peak power point of the panel array 250. Although when fully charged the voltage of the battery 228 may be close to the peak power point of the panel array 250, this is unlikely to be true at sunrise when the battery 228 is at least partially discharged. Therefore, charging may likely begin at a voltage considerably below the array peak power point, and the charge controller 264 is capable of resolving the mismatch. Similarly, as the power generated by the panel array 250 varies due to changes in the amount of solar energy incident upon the array 250 (e.g., from dawn to noon to dusk or from variable cloudiness), the peak power point of the array 250 varies, and the charge controller 264 adjusts accordingly.

In at least one embodiment according to the present disclosure, the battery management functions may include a LED module control, which establishes the optimal on-time profile and power level, known as the duty cycle, for the LED module 210. To achieve this result, the microprocessor 270 calculates the appropriate duty cycle using the total charge current provided to the battery 228 during daylight (i.e., charging) hours each day, resulting from the amount of solar illumination received by the panel array 250, the battery voltage at the time the LED module is to be powered (i.e., dusk), and the anticipated power requirement for the next cycle. Determining the optimal duty cycle is critical because powering the LED module 210 at a constant level when the rechargeable battery 228 does not have sufficient charge to maintain that power level through the nighttime hours can damage the rechargeable battery 228 and reduce its life by draining too much charge.

In at least one embodiment according to the present disclosure, the operational power level provided to the LED module 210 may be varied between 100% and 25% of maximum. Operational power levels below 100% are provided by a pulse width modulation (PWM) circuit incorporated in the controller circuitry 261. The operation and function of PWM circuits are well-known. While the LED module 210 may produce less than full light output after insufficient recharging during periods of extended low solar illumination (e.g., cloudy days), the LED module 210 ensures that the LED module 210 will not turn off completely by automatically adjusting duty cycle. This feature makes the solar-powered LED lighting fixture 200 more reliable than conventional solar-LED lighting.

Figure 25A:
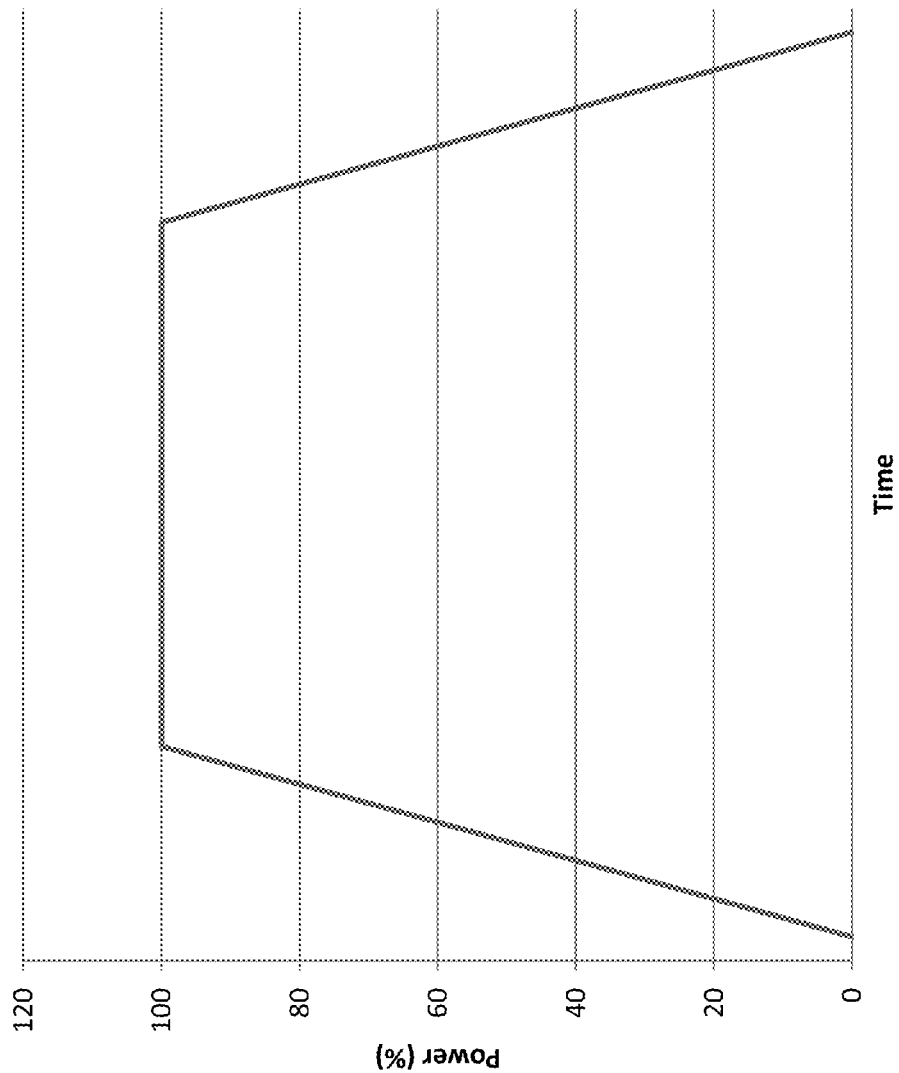
FIGS. 25A and 25B show operational profiles for a solar-powered LED lighting fixture, according to at least one embodiment of the present disclosure.

Because the particular operational power level calculated for a given night by the microprocessor 270 is variable, the control circuitry 261 can produce different overall power profiles. For example, as shown in FIG. 25A, by using a simple counter the power to the LED module 210 can be gradually increased to the operational power level starting at dusk. That operational power level can be maintained for a prescribed period of time and then gradually decreased or ramped down to an OFF state as dawn approaches.

Figure 25B:
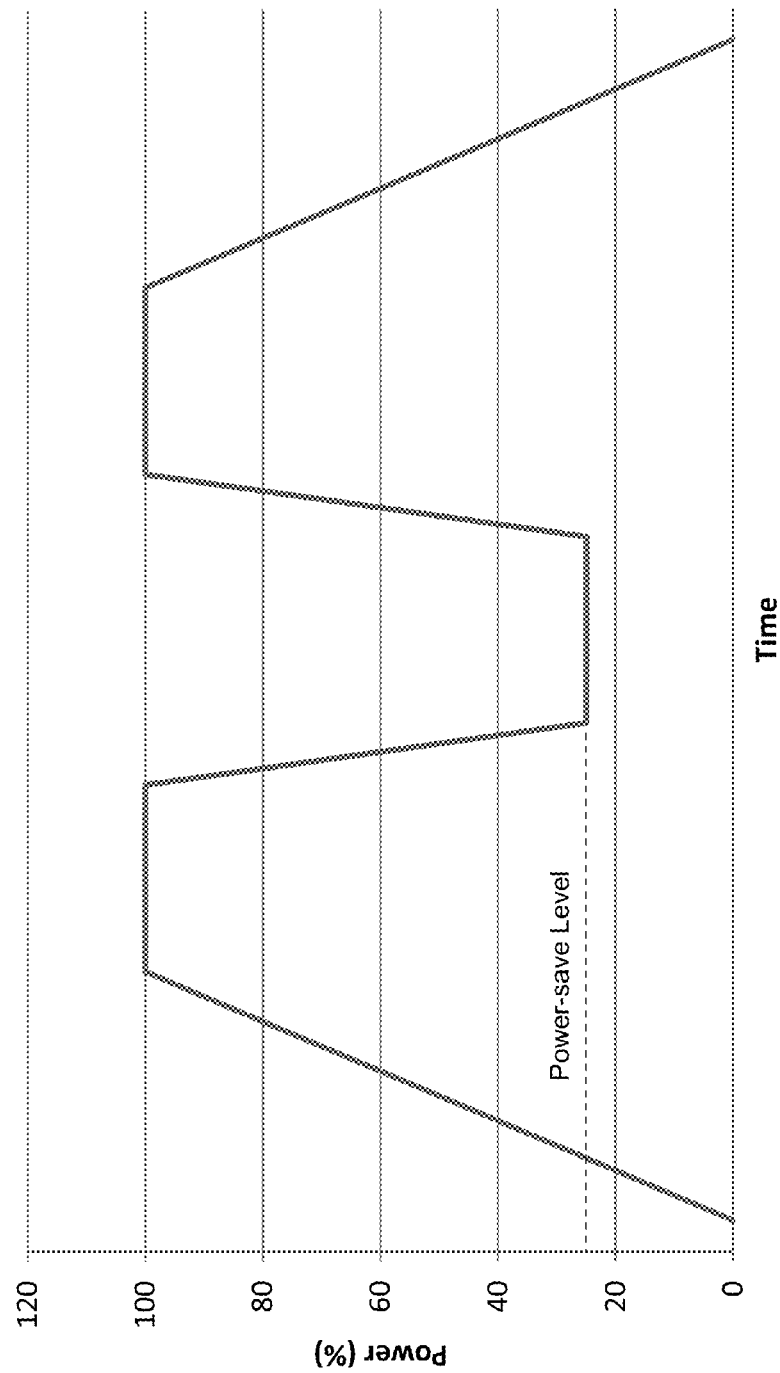

In at least one embodiment according to the present disclosure, the control circuitry 261 includes an electronic real time clock 268 to track the actual time of day as shown in FIG. 23. The real time clock 268 enables the microprocessor 270 to calculate a more complex duty cycle than shown in FIG. 25A, including power ramp up and down periods and power-save periods during nighttime hours when few people are present and maximum lighting is not needed as shown in FIG. 25B. By tracking real time, the real time clock 268 enables the control circuitry 261 to gradually increase to the operational power level starting at dusk and maintain that level until a prescribed time in the early morning hours when there is little human activity. At this time the power to the LED module 210 may be stepped down to a lower level (i.e., power-save mode) to conserve battery power; however, the decrease in light output is only slightly noticeable to a casual observer. Because the real time clock 268 is tracking actual time, as the transition back to daytime approaches, the power to the LED module 210 may be stepped up to the operational level as human activity increases again. Further, once the ambient light increases to the prescribed level, the power to the LED module 210 may be ramped down until reaching the OFF state. In at least one embodiment, the microprocessor 270 may use a calendar look-up table to associate the time of year with the time of dusk and dawn for a given day throughout the year. This information further enables the microprocessor 270 to project the duration of ON time required for a given day and calculate the appropriate duty cycle accordingly. Therefore, the control circuit 261 is capable of various duty cycles resulting from the various possible operational power levels, ramp rates, and durations.

Figure 24:
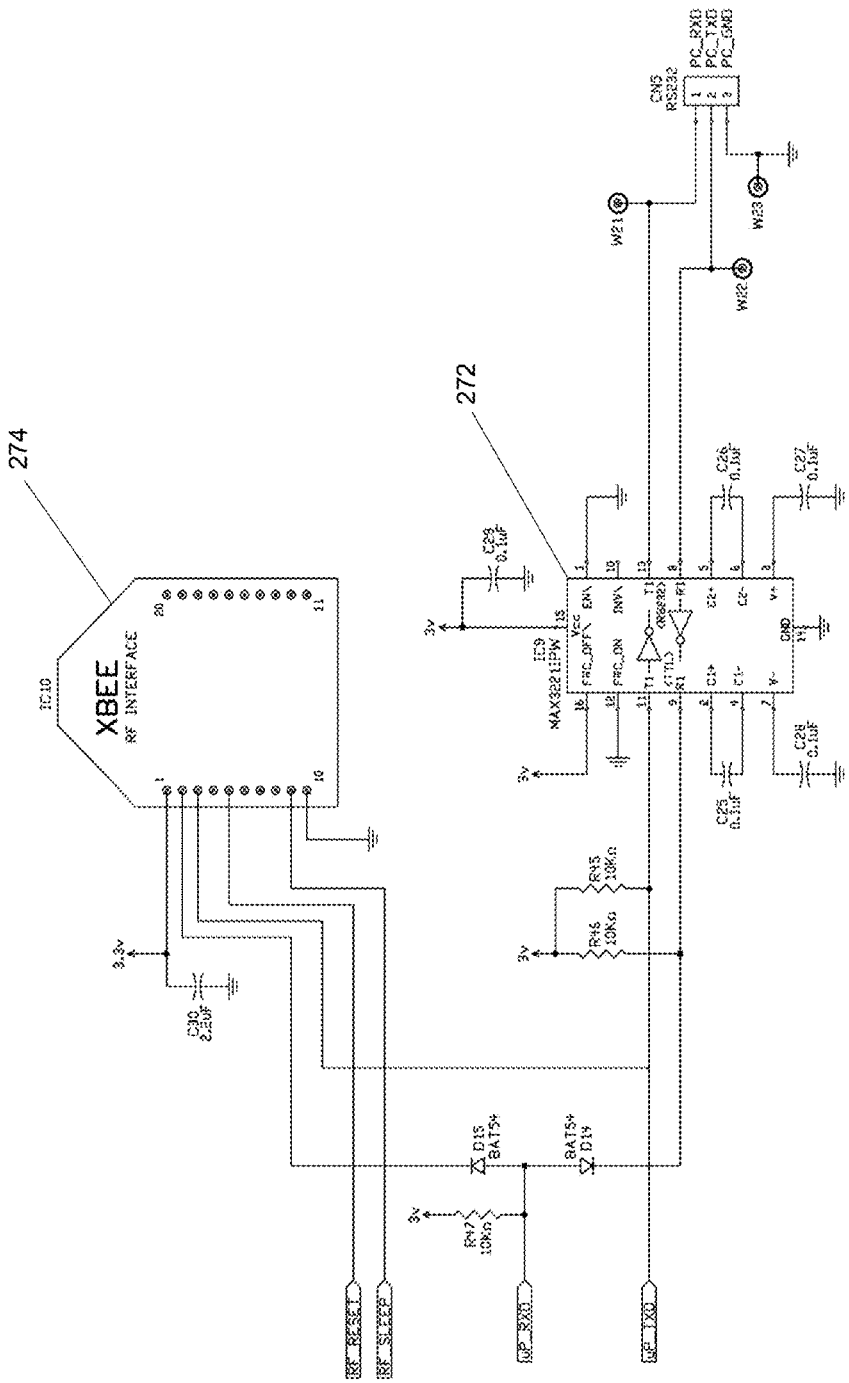

In at least one embodiment according to the present disclosure, the control circuitry 261 includes a remote control sensor 274, as shown in FIG. 24, to enable adjustment or testing of the solar-powered LED lighting fixture 200. The remote control sensor 274 is capable of activation by an appropriate remote control unit (not shown) and may be an infra-red, a radio frequency sensor or the like. Signals received by the remote control sensor 274 trigger the microprocessor 270 to perform such remote functions as turning the LED module 210 on and off, adjusting the ambient light triggering levels, adjusting the maximum light output level, and detecting the status of the rechargeable battery 228 among others.

In at least one embodiment according to the present disclosure as shown in FIG. 24, the controller circuitry 261 includes a digital communication interface serial port 272, such as a RS-232 or USB interface. The communication interface 272 enables the microprocessor 270 to periodically download operational information, such as the status of the individual solar panels 258, the rechargeable battery 228, and LED module 210. The communication interface 272 further enables an operator to upload different control algorithms to the microprocessor 270 and to enable general monitoring of the solar-powered LED lighting fixture 200. In at least one embodiment, controller circuitry 261 may include at least one indicator LED 276 mounted on the control circuit board 260 as shown in FIG. 23. The indicator LEDs 276 enable the control circuitry 261 to visually communicate the status of specific system components, such as the battery 228 and the charge controller 264, and to report malfunctions or interruptions in the system. For example, four indicator LEDs 276 may provide battery charge status, microprocessor function, charge controller status, and diagnostic reporting via a flash sequence of the indicator LEDs 276.

Figure 26:
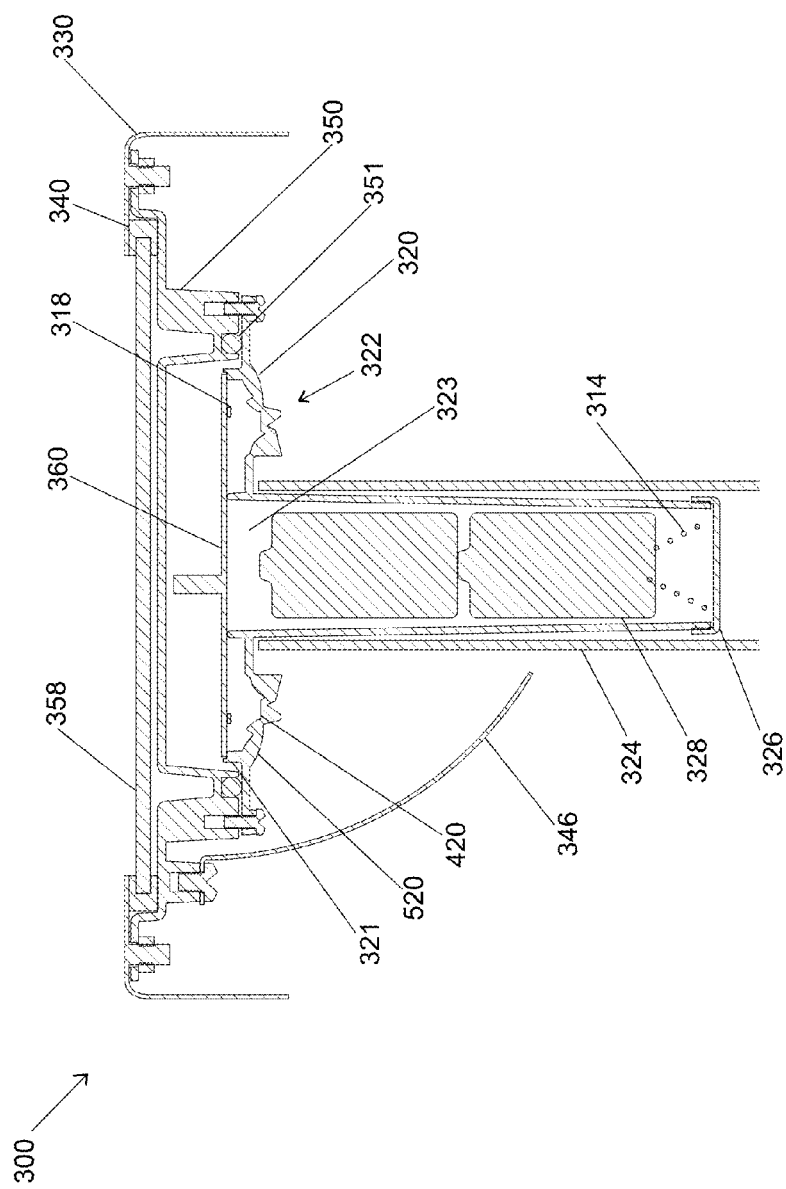
FIG. 26 shows a cross-sectional view of a solar-powered LED lighting fixture, according to at least one embodiment of the present disclosure.
Figure 31:
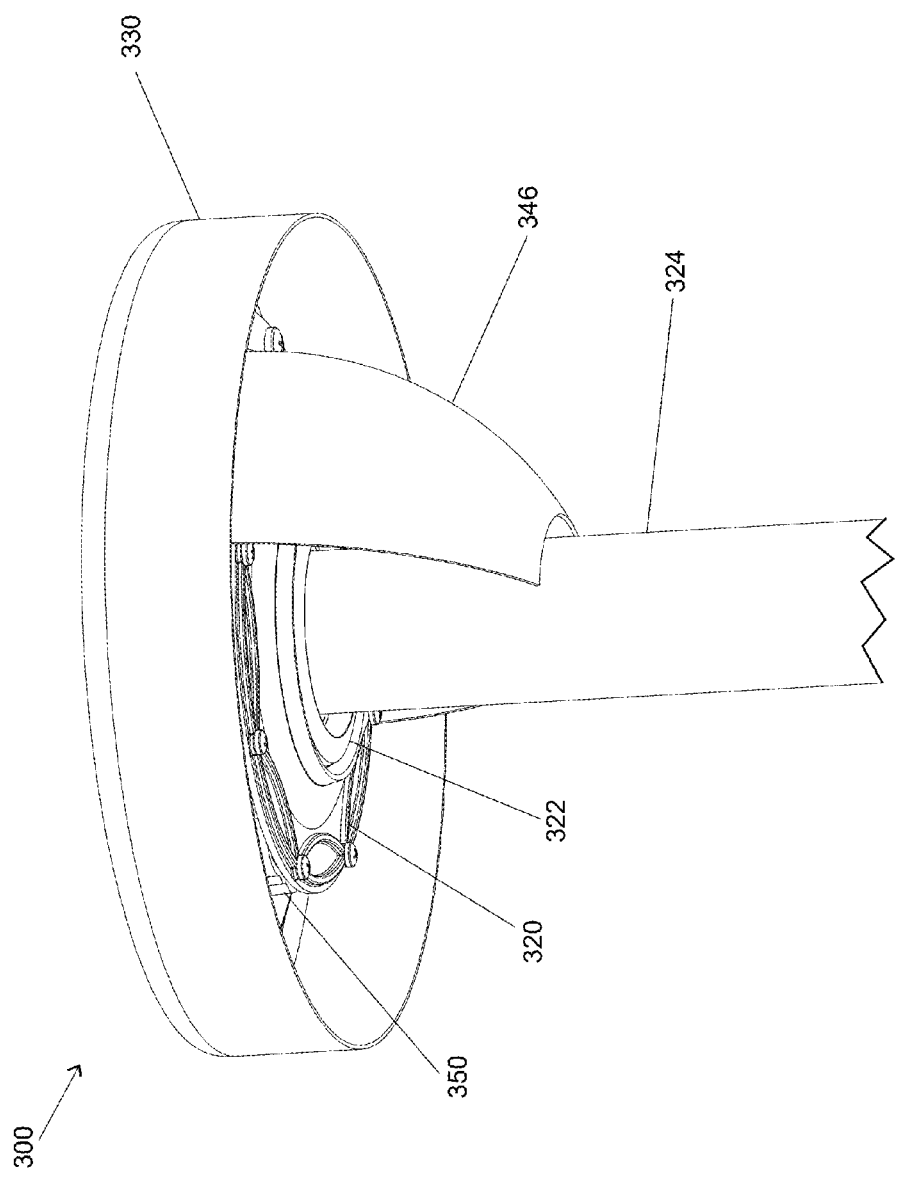
FIG. 31 shows an isometric view of a solar-powered LED lighting fixture, according to at least one embodiment of the present disclosure.

The solar-powered LED lighting fixture 200 may be adapted to applications where a less expensive light fixture is desired. FIGS. 26 and 31 show a solar-powered LED lighting fixture 300 according to at least one embodiment of the present disclosure. A solar-powered LED lighting fixture 300 includes a solar panel 358, control circuit board 360, and a rechargeable battery 328. The solar panel 358 is electrically connected to the circuit board 360, as is the rechargeable battery 328. The solar-powered LED lighting fixture 300 further comprises a shroud 330, a housing 350, and a lens 320. The shroud 330 may provide both an aesthetic cover and protection from environmental exposure for the remaining parts of the lighting fixture 300. The solar panel 358 may be positioned between the housing 350 and the shroud 330, which is formed with an opening to allow solar radiation to reach the solar panel 358. The housing 350 is securely attached to the underside of shroud. The periphery of the solar panel 358 may be environmentally sealed between the shroud 330 and the housing 350 by a panel seal 340, which also isolates the volume between the solar panel 358 and the housing 350 from the environment. The lens 320 may be securely attached to the housing 350 opposite the solar panel 340 and environmentally sealed to the housing 350 by a housing seal 351 position therebetween.

In at least one embodiment according to the present disclosure, the control circuit board 360 includes a plurality of LEDs 318 and control circuitry 361, which enables power management functions for automatic power control for the LEDs 318 and battery management functions for the interface between the solar panel 358 and the rechargeable battery 328. The circuit board 360 may be attached to the lens 320, within the volume bounded by the housing 350 and the lens 320, by any appropriate means, including mechanical fasteners, adhesive, or the like. The circuit board 360 may be positioned on at least one lens rib 321 to enable proper positioning of the LEDs 318 relative to the lens 320, which is critical to the optical performance of the lens 320. In at least one embodiment, the circuit board 360 may be made with a metal core to efficiently transfer heat from the LEDs 318 to the other parts of the fixture 300.

Figure 32:
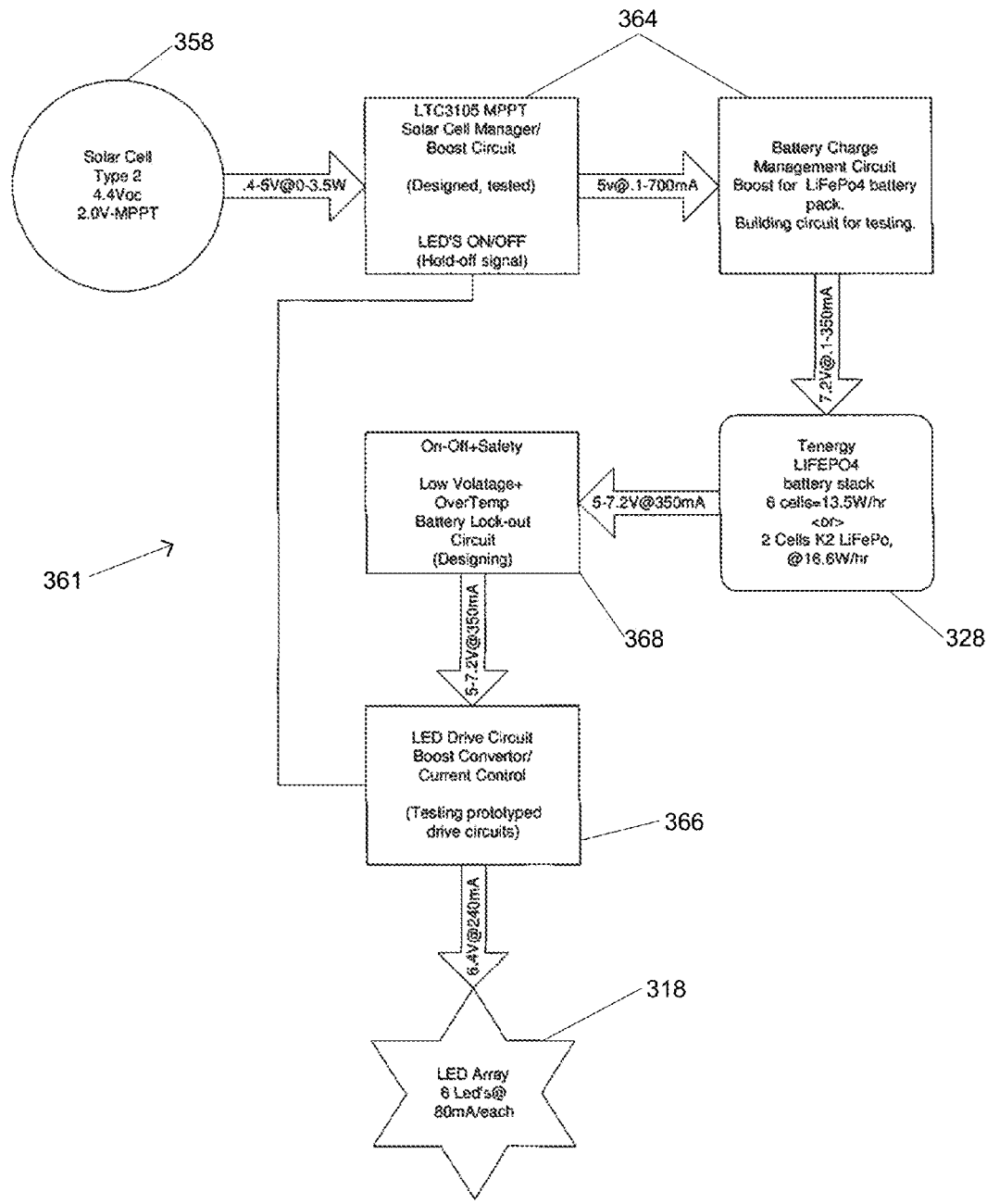
FIG. 32 shows a block diagram of control circuitry, according to at least one embodiment of the present disclosure.

In at least one embodiment according to the present disclosure, the control circuitry 361 performs the functions shown in FIG. 32. The control circuitry 361 may be configured to enable automatic on-off control, which activates the LEDs 318 when the ambient light is below a prescribed level (i.e., dusk) and deactivates the LEDs 318 when the ambient light is above a prescribed level (i.e., dawn), by monitoring the voltage of the solar panel 358. In at least one embodiment, the control circuitry 361 deactivates the LEDs 318 after a prescribed amount of time after automatic activation as a power conservation feature. Moreover, the control board 360 may include a manual switch 368 to enable selection of a power-save mode, whereby the LEDs 318 are powered at some value less than the full operational power level (e.g., at 50% power). In at least one embodiment, the control circuitry 361 includes MPPT charge control 364 and constant current control 366 as describe herein.

Figure 29:
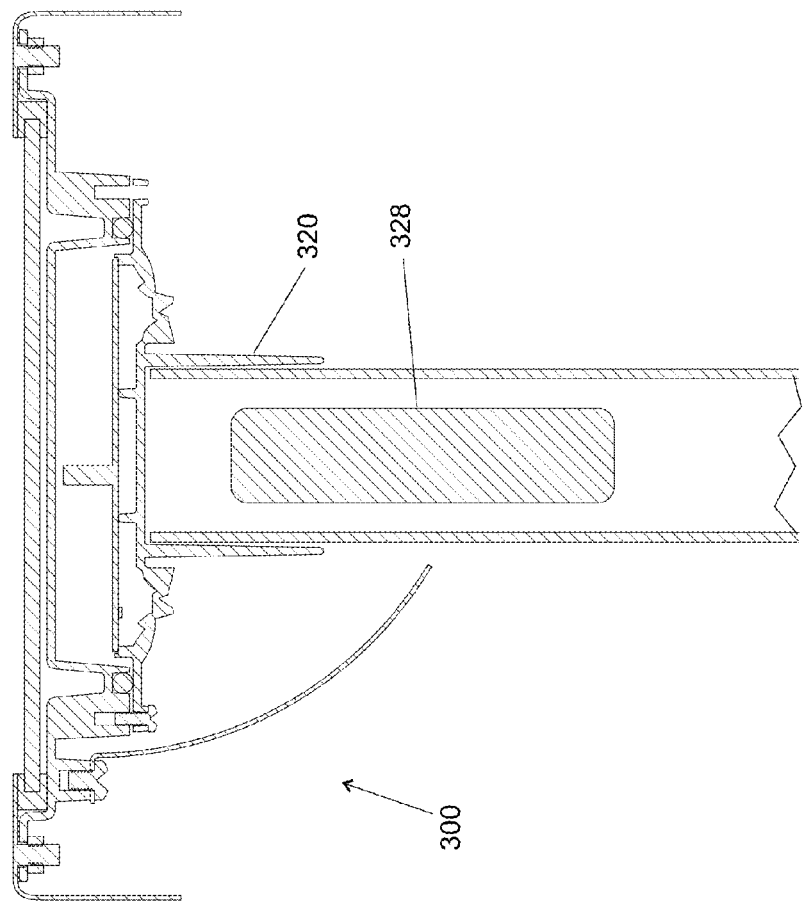
FIG. 29 shows a cross-sectional view of a solar-powered LED lighting fixture, according to at least one embodiment of the present disclosure.

In at least one embodiment according to the present disclosure, the rechargeable battery 328 may include a plurality of battery cells electrically connected in parallel or series, as shown in FIG. 26. The rechargeable battery 328 may be positioned within a chamber 323 formed in the lens 320 as to accommodate the battery 328. The chamber 323 may be environmentally sealed by a battery cap 326 at the end opposite the circuit board 360. The battery cap 326 may include a contact spring 314 to enable and maintain the electrical connection between the battery 328 and the circuit board 360. Further, the chamber 323 may be formed such that it will fit within a post 324, which may be used to mount the fixture 300 when in use. In at least one embodiment, the lens may be formed to surround the post 324 as shown in FIG. 29.

Figure 27:
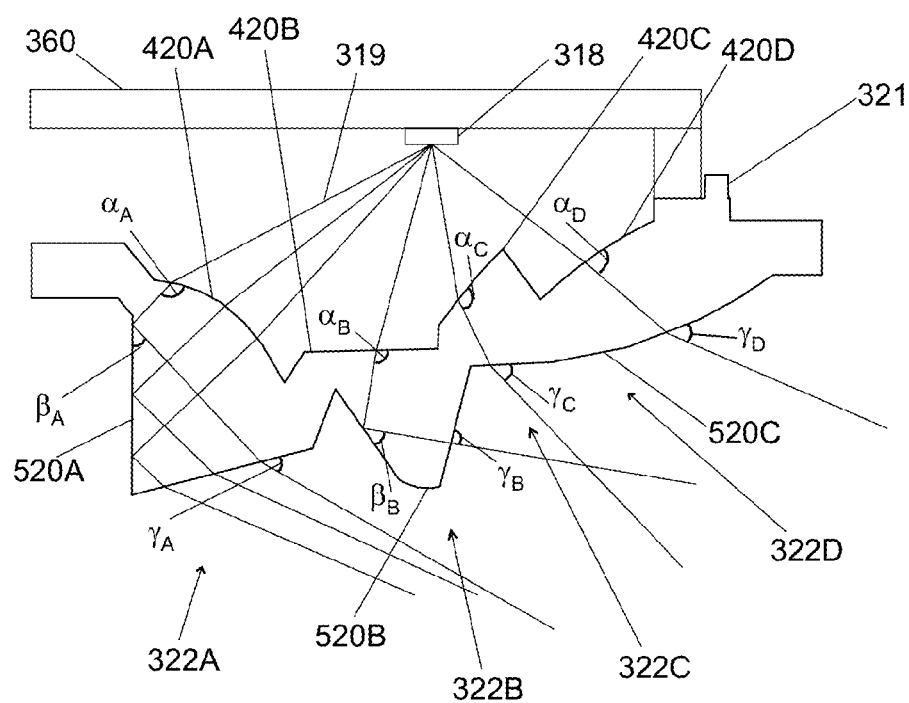
FIG. 27 illustrates ray traces from a LED light source and a lens optic, according to at least one embodiment of the present disclosure.

In at least one embodiment according to the present disclosure, the lens 320 includes an optic 322 integral to the at least one leg rib 321 and the battery chamber 323. The lens 320 includes a first surface 420 and a second surface 520. As described in detail herein, the optic 322 may be designed using Snell's Law, while also allowing for manufacturing considerations, to form the first surface 420 and the second surface 520 as integrated surfaces with distinct optical facets. In at least one embodiment as shown in FIG. 31, the optic 322 may be a continuous feature formed at a diameter within the generally disk-shaped lens 320. FIG. 27 shows a detail cross-section of the optic 322, which may include at least four distinct but integrated optical facets 322A, 322B, 322C, and 322D.

Figure 28:
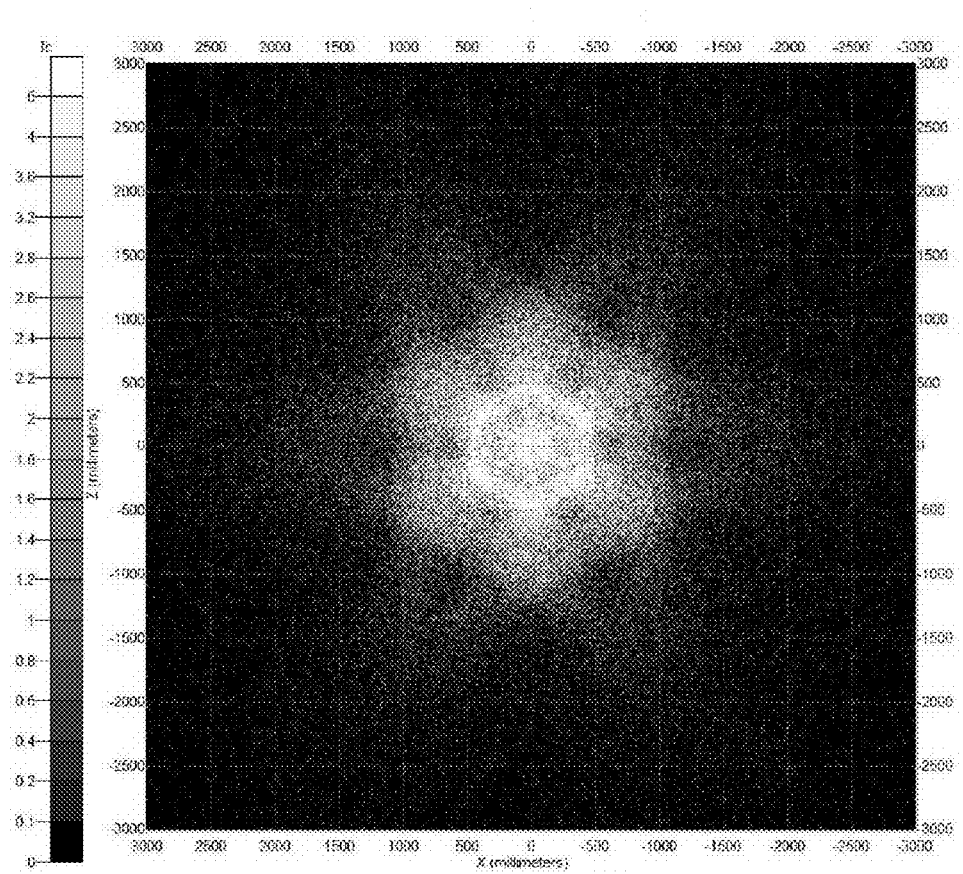
FIG. 28 presents an iso-illumination plot, as measured in foot-candles (fc) and delineated in millimeters (mm), according to at least one embodiment of the present disclosure.

Each of the facets 322A, 322B, 322C, and 322D may be formed to direct separate portions of the light distribution emitted by the LED 318 into a desired illumination pattern with maximum optical efficacy as shown in FIG. 28, in which light intensity incident on a plane parallel to ground about 18 inches from the LED 318 is reported in foot-candles (fc) and delineated in millimeters (mm). As shown in FIG. 27 a convex first surface 420A of facet 322A is formed to concentrate light rays 319 by refracting them at angles $\alpha_A$ onto a nearly vertical portion of a second surface 520A such that the light ray 319 is internally reflected by the nearly vertical portion of second surface 520A at angles $\beta_A$, such that the light ray 319 is refracted by an angled portion of second surface 520A at angles $\gamma_A$. Similarly, a substantially flat first surface 420B of facet 322B is formed to refract light rays 319 at angles $\alpha_B$ onto an independently angled portion of second surface 520B such that the light ray 319 is internally reflected by the independently angled portion of second surface 520B at angles $\beta_B$, such that the light ray 319 is only slightly refracted by a nearly vertical portion of second surface 520B at angles $\gamma_B$. Furthermore, an angled first surface 420C of facet 322C is formed to refract light rays 319 at angles $\alpha_C$ such that the light ray 319 is refracted by a concave portion of a second surface 520C at angles $\gamma_C$. Similarly, a convex first surface 420D of facet 322D is formed to refract light rays 319 at angles $\alpha_D$ such that the light ray 319 is refracted by a concave portion of second surface 520C at angles $\gamma_D$. Therefore, the integrated optic 322 uses a unique combination of total internal reflection (in facets 322A and 322B) and Fresnel-style double refraction (in facets 322C and 322D) to enable a highly uniform illumination pattern as shown in FIG. 28.

In at least one embodiment according to the present disclosure, the solar-powered LED lighting fixture 300 may include a reflector 346 when the fixture 300 is use in a location where light is not wanted in a full 360 pattern around the fixture 300—for example, when placed along a wall, along a sidewalk, or in a corner.

While various embodiments of LED light module with variable optic lens have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

We claim:
1. A lighting fixture comprising:
   at least one light-emitting diode electrically connected to a control circuit;
   at least one solar panel electrically connected to the control circuit and capable of converting solar radiation into electrical energy, wherein the electrical energy is stored in a rechargeable battery electrically connected to the control circuit;
   at least one lens, wherein the lens is comprised of a plurality of integral optical elements comprising an inner surface and an outer surface, wherein the outer surface comprises a substantially curvilinear refracting surface defining a generally conical shape revolved around an axis, wherein the lens includes a focal point disposed on the axis, the light-emitting diode disposed at the focal point, and wherein the inner surface is comprised of at least one optical element having both a refracting facet and an internally reflecting facet, and wherein further light reflected and/or refracted by the optical element is further refracted by the outer surface to exit the lens at an angle below a horizontal plane; and wherein the control circuit regulates charging the rechargeable battery by adjusting the charge current supplied from the solar panel to the rechargeable battery in response to changes in the voltage of the solar panel.

2. The lighting fixture of claim 1, wherein the control circuit further comprises a microprocessor to calculate an operational profile based on the charge stored in the rechargeable battery and an anticipated power requirement for the next cycle.

3. The lighting fixture of claim 2, wherein the control circuit is configured to adjust the power provided to the at least one light-emitting diode by incremental steps from one power level to the next over time.

4. The lighting fixture of claim 2, wherein the control circuit further comprises a real time clock.

5. The lighting fixture of claim 2, wherein the control circuit further comprises a calendar look-up table comprising sunrise and sunset information for one year.

6. The lighting fixture of claim 1, wherein the control circuit is configured to adjust the charge current from the solar panel to the rechargeable battery using a maximum power point tracking circuit.

7. The lighting fixture of claim 1, wherein the control circuit is configured to monitor the solar panel voltage and to determine when to power the at least one light-emitting diode on and off.

8. The lighting fixture of claim 1, wherein at least one facet of the lens is configured such that light emanating from the light-emitting diode is incident upon a refracting surface of the facet at a substantially perpendicular angle and is reflected from an internally reflecting surface of the facet at an angle greater than 90 degrees from the axis of the lens.

9. A LED light module comprising:
a heat sink including a top surface, a bottom surface, and a side surface defining a perimeter, wherein the side surface includes a groove disposed therein;
a light-emitting diode in thermal contact with the heat sink at the top surface;
a boss extending from the bottom surface, wherein the boss is electrically isolated from the light-emitting diode and includes threads, and wherein the heat sink further includes a channel extending from the first surface through the boss; and
a lens including a locating feature, the lens attached to the heat sink such that the locating feature is disposed in the groove of the heat sink,
wherein the lens is comprised of a plurality of integral optical elements comprising an inner refracting surface and an outer refracting surface, wherein the outer optical surface comprises a substantially curvilinear refracting surface defining a conical shape revolved around an axis, wherein the lens includes a focal point disposed on the axis, the light-emitting diode disposed at the focal point, and
wherein the inner optical surface is comprised of at least one refracting facet and at least one internally reflecting facet, the refracting facet oriented such that light emanating from the light-emitting diode is incident upon the refracting surface at a substantially perpendicular angle and is reflected from the reflecting surface at an angle greater than 90 degrees from the axis, and wherein further light reflected by the reflecting surface is further refracted by the outer optical surface to exit the lens at an angle below a horizontal plane.

10. The LED light module of claim 9, wherein the integral optical elements are capable of directing light in an arc substantially greater than 270 degrees from the axis of the light-emitting diode.

11. A variable optic lens, the lens comprising:
a plurality of integral optical elements comprising an inner surface and an outer surface, wherein the outer surface comprises a curvilinear refracting surface defining a generally conical shape revolved around an axis, wherein the lens includes a focal point disposed on the axis, and
wherein the inner surface is comprised of a plurality of inner optical facets, each having both a refracting surface and an internally reflecting surface, and wherein the outer surface includes a plurality of outer optical facets, each having both a refracting surface and an internally reflecting surface, wherein the optical elements are structured such that light reflected and/or refracted by the inner surface is further refracted and/or reflected by the outer surface to exit the lens at an angle below a horizontal plane.

12. The lens of claim 11, wherein the integral optical elements are capable of directing light from an upward facing light-emitting diode disposed at the focal point into a light distribution that is below the horizontal plane.

13. The lens of claim 11, wherein the integral optical elements are capable of directing light in an arc substantially greater than 270 degrees from the central axis of the at least one light-emitting diode, and wherein the inner surface and/or the outer surface includes a surface treatment, the surface treatment configured to diffuse the light.

14. An apparatus comprising:
a heat sink having a first face, a second face, and a side wall, wherein the side wall includes a locating feature and the second face includes an attachment feature;
a light-emitting diode mounted to and in thermal contact with the first face of the heat sink; and
a lens including a mating feature, the lens mounted to the heat sink such that the mating feature is at least partially disposed in the locating feature of the heat sink, wherein the attachment feature includes a threaded boss that is electrically isolated from the light-emitting diode.

15. The apparatus of claim 14, wherein the heat sink has a generally cylindrical shape along an axis, and the first face and the second face are opposing ends of the generally cylindrical heat sink, and wherein at least a portion of the lens has a generally cylindrical shape corresponding to the shape of the heat sink.

16. The apparatus of claim 14, wherein the heat sink further includes a channel from the first face to the second face through which an electrical connection passes to between the light-emitting diode and a power source.

17. The apparatus of claim 16, wherein the attachment feature extends from the second face opposite the first face.

18. The apparatus of claim 14, wherein the locating feature of the heat sink comprises a groove.

19. The apparatus of claim 14, wherein the lens further includes a plurality of integral optical elements configured to direct light emitted by the light-emitting diode into a desire light distribution.

20. The apparatus of claim 19, wherein the plurality of optical elements form an inner surface and an outer surface, wherein the inner surface comprises at least one optical element having both a refracting facet and an internally reflecting facet, and wherein further light reflected and/or refracted by the inner surface is further refracted by the outer surface to exit the lens at an angle below a horizontal plane.

21. The apparatus of claim 14, the apparatus further comprising a retainer disposed about the lens and structured to secure the lens to the heat sink.

* * * * *